(12) United States Patent
Nasu et al.

(10) Patent No.: US 11,715,055 B2
(45) Date of Patent: Aug. 1, 2023

(54) MANUFACTURE AND SALES STRATEGY PLANNING METHOD AND DEVICE THEREOF

(71) Applicants: HITACHI, LTD., Tokyo (JP); HITACHI SOLUTIONS, LTD., Tokyo (JP)

(72) Inventors: Hiroaki Nasu, Tokyo (JP); Nobuhiro Kakeno, Tokyo (JP); Yasuhiro Ozawa, Tokyo (JP); Sana Imakubo, Tokyo (JP); Yuuichi Terazaki, Tokyo (JP)

(73) Assignees: HITACHI, LTD., Tokyo (JP); HITACHI SOLUTIONS, LTD., Tokyo (JP)

( * ) Notice: Subject to any disclaimer, the term of this patent is extended or adjusted under 35 U.S.C. 154(b) by 198 days.

(21) Appl. No.: 17/191,994

(22) Filed: Mar. 4, 2021

(65) Prior Publication Data
US 2022/0004956 A1  Jan. 6, 2022

(30) Foreign Application Priority Data
Jul. 3, 2020 (JP) .................................. 2020-115752

(51) Int. Cl.
*G06Q 10/0637* (2023.01)
*G06Q 50/04* (2012.01)
*G06Q 10/0631* (2023.01)

(52) U.S. Cl.
CPC . *G06Q 10/06375* (2013.01); *G06Q 10/06315* (2013.01); *G06Q 50/04* (2013.01)

(58) Field of Classification Search
CPC ........................................... G06Q 10/00–50/00
(Continued)

(56) References Cited

U.S. PATENT DOCUMENTS

| | | | | |
|---|---|---|---|---|
| 5,630,070 A | * | 5/1997 | Dietrich | G06Q 10/06313 705/7.23 |
| 5,657,453 A | * | 8/1997 | Taoka | G05B 19/41865 705/28 |

(Continued)

FOREIGN PATENT DOCUMENTS

| | | |
|---|---|---|
| JP | 2009-116780 | 5/2009 |
| JP | 2019-008501 | 1/2019 |

*Primary Examiner* — Alan S Miller
(74) *Attorney, Agent, or Firm* — Foley & Lardner LLP

(57) ABSTRACT

Provided is a manufacture and sales strategy planning method comprising a step of determining, based on information related to a sales plan of a plurality of products and a production capacity of a production facility to produce each product, whether there is any spare capacity in the production capacity of the production facility in relation to the sales plan for each of the products, a step of applying one among a plurality of profit improvement strategies, according to an availability of the spare capacity, to each product determined in this step, and calculating an improvement effect of each product, a step of selecting, based on each calculation result obtained in this step, a specific product among the plurality of products in which the improvement effect has exceeded a set value with regard to each of the plurality of profit improvement strategies, a step of extracting, for each profit improvement strategy, an item which satisfies a restricting condition of sale or production of the specific product selected in this step and which configures the specific product, and a step of planning a manufacture and sales strategy related to the items extracted in this step, and selecting one or more specific item strategies based on the improvement effect, wherein a supply and demand plan is simulated by reflecting the improvement effect of the selected strategy.

18 Claims, 27 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,913,200 | A * | 6/1999 | Wakiyama | G06Q 10/06315 705/7.22 |
| 6,240,400 | B1 * | 5/2001 | Chou | G06Q 99/00 705/37 |
| 6,311,094 | B1 * | 10/2001 | Iriuchijima | G06Q 10/06 700/95 |
| 7,689,456 | B2 * | 3/2010 | Schroeder | G06Q 10/04 705/7.31 |
| 2009/0150208 | A1 * | 6/2009 | Rhodes | G06Q 10/087 705/28 |
| 2011/0270429 | A1 * | 11/2011 | Sidner | G06Q 50/04 700/100 |
| 2013/0275338 | A1 * | 10/2013 | Hosoda | G06Q 40/06 705/36 R |
| 2014/0071480 | A1 * | 3/2014 | Zhou | G06Q 10/0633 358/1.15 |
| 2015/0379450 | A1 * | 12/2015 | Nomoto | G06Q 10/0875 705/7.25 |

\* cited by examiner

FIG.5A

| # | PRODUCT NAME | | SUPPLIABLE QUANTITY (t) | | | SPARE CAPACITY | |
|---|---|---|---|---|---|---|---|
| | | | JAPANESE FACTORY | CHINESE FACTORY | FRENCH FACTORY | SALES DEVIATION AT TIME OF SUPPLY (K¥) | GROSS PROFIT DEVIATION AT TIME OF SUPPLY (K¥) | DETERMINATION |
| 33 | PRODUCT 1 | 83.9 | | 83.9 | | 555,659,000 | 412,252,000 | SPARE CAPACITY IS AVAILABLE |
| 35 | PRODUCT 2 | 152.0 | 42.9 | 109.2 | | 493,898,000 | 220,973,000 | SPARE CAPACITY IS AVAILABLE |
| 36 | PRODUCT 3 | 142.2 | | 142.2 | | 245,868,000 | 77,682,000 | SPARE CAPACITY IS AVAILABLE |

FIG.5B

| # | PRODUCT | DEMAND QUANTITY (t) | SUPPLY QUANTITY (t) | SUPPLY QUANTITY BREAKDOWN ||| SALES (K¥) | GROSS PROFIT (K¥) | GROSS PROFIT RATIO |
|---|---|---|---|---|---|---|---|---|---|
| | | | | JAPANESE FACTORY | CHINESE FACTORY | FRENCH FACTORY | | | |
| 1 | PRODUCT 4 | 9.2 | 0.0 | | | | 0 | | |
| 3 | PRODUCT 5 | 308.2 | 269.3 | 110.7 | 94.8 | 63.9 | 771,909,000 | 181,018,000 | 23% |
| 20 | PRODUCT 6 | 81.2 | 60.4 | 60.4 | | | 579,389,000 | 171,272,000 | 30% |
| 24 | PRODUCT 7 | 37.8 | 0.2 | 0.2 | | | 997,000 | 559,000 | 56% |
| 25 | PRODUCT 8 | 468.1 | 446.8 | 61.9 | 16.5 | 368.4 | 1,007,395,000 | 86,291,000 | 9% |

| NON-PRODUCIBLE |||| DETERMINATION |
|---|---|---|---|---|
| NON-PRODUCIBLE QUANTITY (t) | LOST SALES (K¥) | LOST GROSS PROFIT (K¥) | LOST GROSS PROFIT (K¥/t) | |
| (9.2) | 81,620,000 | 38,598,000 | 4190,000 | NON-PRODUCIBLE |
| (38.8) | 97,412,000 | 39,753,000 | 1024,000 | NON-PRODUCIBLE |
| (20.8) | 161,014,000 | 33,130,000 | 1591,000 | NON-PRODUCIBLE |
| (37.7) | 139,048,000 | 73,019,000 | 1939,000 | NON-PRODUCIBLE |
| (21.3) | 42,339,000 | 17,596,000 | 827,000 | NON-PRODUCIBLE |

FIG.8A

| # | PRODUCT NAME | SUPPLIABLE QUANTITY (t) | | | SPARE CAPACITY | | |
|---|---|---|---|---|---|---|---|
| | | JAPANESE FACTORY | CHINESE FACTORY | FRENCH FACTORY | SALES DEVIATION AT TIME OF SUPPLY (K¥) | GROSS PROFIT DEVIATION AT TIME OF SUPPLY (K¥) | DETERMINATION |
| 33 | PRODUCT 1 | 83.9 | 83.9 | | 555,659,000 | 412,252,000 | SPARE CAPACITY IS AVAILABLE |
| 35 | PRODUCT 2 | 152.0 | 109.2 | 42.9 | 493,898,000 | 220,973,000 | SPARE CAPACITY IS AVAILABLE |
| 36 | PRODUCT 3 | 142.2 | 142.2 | | 245,868,000 | 77,682,000 | SPARE CAPACITY IS AVAILABLE |

FIG.8B

| SENSITIVITY ANAL N DEMAND IS INCREASED BY 10% BY FACILITY WHICH INFLUENCES SALES SITE, PRODUCT AND MANUFACTURING COST | PROFIT (M¥) | PROFIT RATIO (%) | PRODUCTION TON UNIT PROFIT (M¥/t) | FACILITY OCCUPANCY TIME UNIT PROFIT (¥/h) | FACILITY OPERATING RATE UNIT PROFIT (M¥/%) | SALES (M¥) | MANUFACTURING COST (M¥) |
|---|---|---|---|---|---|---|---|
| SALES SITE A, PRODUCT 2, FACILITY CLASSIFICATION I | 128860 | 0.27 | 700 | 56871560 | 13580 | 248310.00 | 119450.00 |
| SALES SITE B, PRODUCT 2, FACILITY CLASSIFICATION I | 114930 | 0.26 | 620 | 61331440 | 11020 | 206800.00 | 91870.00 |
| SALES SITE A, PRODUCT 1, FACILITY CLASSIFICATION I | 114040 | 0.30 | 1120 | 66060980 | 17480 | 174290.00 | 60240.00 |
| SALES SITE A, PRODUCT 3, FACILITY CLASSIFICATION I | 105790 | 0.26 | 2490 | 108577600 | 39640 | 171430.00 | 65640.00 |
| SALES SITE C, PRODUCT 3, FACILITY CLASSIFICATION III | 92290 | 0.23 | 1840 | 288094260 | 44250 | 152230.00 | 59950.00 |
| SALES SITE B, PRODUCT 1, FACILITY CLASSIFICATION II | 60050 | 0.06 | 520 | 74814050 | 15140 | 162030.00 | 101980.00 |
| SALES SITE C, PRODUCT 3, FACILITY CLASSIFICATION I | 54000 | 0.11 | 1780 | 76270190 | 65010 | 102710.00 | 48710.00 |
| SALES SITE C, PRODUCT 1, FACILITY CLASSIFICATION III | 36440 | (0.06) | 230 | 32064230 | 4430 | 169050.00 | 132610.00 |
| SALES SITE C, PRODUCT 2, FACILITY CLASSIFICATION I | 29940 | 0.07 | 730 | 59567240 | 15290 | 55260.00 | 25330.00 |
| SALES SITE D, PRODUCT 2, FACILITY CLASSIFICATION I | 28700 | 0.06 | 750 | 58992780 | 23400 | 53100.00 | 24400.00 |
| SALES SITE D, PRODUCT 3, FACILITY CLASSIFICATION I | 25920 | 0.05 | 7330 | 28025220 | 308380 | 31930.00 | 6010.00 |
| SALES SITE A, PRODUCT 1, FACILITY CLASSIFICATION III | 24870 | 0.04 | 620 | 77264240 | 14350 | 53430.00 | 28560.00 |

FIG.9

| ITEM NAME, PROCESS 301 | CUSTOMER NAME 302 | SALES SITE 303 | DEMAND QUANTITY 304 | SUPPLY QUANTITY 305 | SALES 306 | PRODUCT 307 | GROSS PROFIT 308 | GROSS PROFIT RATIO 309 | GROSS PROFIT/t 310 |
|---|---|---|---|---|---|---|---|---|---|
| ITEM 1, A PROCESS PRODUCT | CUSTOMER 1 | SITE E | 1.1 | 1.1 | 5130.8000 | PRODUCT 1 | 2390000 | 47% | 2173000 |
| ITEM 1, A PROCESS PRODUCT | CUSTOMER 2 | SITE E | 1.2 | 1.2 | 5595.4000 | PRODUCT 1 | 2606000 | 47% | 2172000 |
| ITEM 1, A PROCESS PRODUCT | CUSTOMER 3 | SITE C | 1.3 | 1.3 | 39805.3000 | PRODUCT 1 | 9264000 | 23% | 713000 |
| ITEM 1, A PROCESS PRODUCT | CUSTOMER 4 | SITE C | 14.4 | 14.4 | 50577.6000 | PRODUCT 1 | 16747000 | 33% | 1163000 |
| ITEM 1, A PROCESS PRODUCT | CUSTOMER 5 | SITE B | 0.1 | 0.1 | 543.452000 | PRODUCT 1 | 347000 | 64% | 3469000 |
| ITEM 1, A PROCESS PRODUCT | CUSTOMER 6 | SITE B | 0.3 | 0.3 | 2221.65000 | PRODUCT 1 | 1632000 | 73% | 5440000 |
| ITEM 1, A PROCESS PRODUCT | CUSTOMER 7 | SITE B | 2 | 2 | 7598.64000 | PRODUCT 1 | 3667000 | 48% | 1834000 |
| ITEM 2, A PROCESS PRODUCT | CUSTOMER 8 | SITE B | 2.4 | 2.4 | 12056.4000 | PRODUCT 1 | 7339000 | 61% | 3058000 |
| ITEM 2, A PROCESS PRODUCT | CUSTOMER 9 | SITE B | 0.1 | 0.1 | 679.303000 | PRODUCT 1 | 483000 | 71% | 4827000 |
| ITEM 2, A PROCESS PRODUCT | CUSTOMER 10 | SITE B | 1 | 1 | 6057.64000 | PRODUCT 1 | 4092000 | 68% | 4092000 |
| ITEM 2, A PROCESS PRODUCT | CUSTOMER 11 | SITE B | 10 | 10 | 27946.6000 | PRODUCT 1 | 8291000 | 30% | 829000 |
| ITEM 2, A PROCESS PRODUCT | CUSTOMER 12 | SITE F | 40 | 40 | 132082000 | PRODUCT 1 | 42913000 | 32% | 1073000 |

FIG.10

| # | PRODUCT | TOTAL SUPPLY QUANTITY ||| OPERATING RATE (SPARE CAPACITY) |||||||||
|---|---|---|---|---|---|---|---|---|---|---|---|---|
| | | | | | JAPANESE FACTORY ||| CHINESE FACTORY ||| FRENCH FACTORY |||
| | | JAPANESE FACTORY | CHINESE FACTORY | FRENCH FACTORY | A PROCESS | B PROCESS | C PROCESS | A PROCESS | B PROCESS | C PROCESS | A PROCESS | B PROCESS | C PROCESS |
| 24 | PRODUCT 1 | 84 | 0 | 0 | 3.4% | 0.0% | 0.0% | 3.3% | 0.0% | 0.0% | 0.0% | 0.0% | - |

FIG.14

| # | PRODUCT | DEMAND QUANTITY (t) | SUPPLY QUANTITY (t) | SUPPLY QUANTITY BREAKDOWN | | | SALES (K¥) | GROSS PROFIT (K¥) | GROSS PROFIT RATIO |
|---|---|---|---|---|---|---|---|---|---|
| | | | | JAPANESE FACTORY | CHINESE FACTORY | FRENCH FACTORY | | | |
| 1 | PRODUCT 4 | 9.2 | 0.0 | | | | 0 | | |
| 3 | PRODUCT 5 | 308.2 | 269.3 | 110.7 | 94.8 | 63.9 | 771,909,000 | 181,018,000 | 23% |
| 20 | PRODUCT 6 | 81.2 | 60.4 | 60.4 | | | 579,389,000 | 171,272,000 | 30% |
| 24 | PRODUCT 7 | 37.8 | 0.2 | 0.2 | | | 997,000 | 559,000 | 56% |
| 25 | PRODUCT 8 | 468.1 | 446.8 | 61.9 | 16.5 | 368.4 | 1,007,395,000 | 86,291,000 | 9% |

| NON-PRODUCIBLE | | | | DETERMINATION |
|---|---|---|---|---|
| NON-PRODUCIBLE QUANTITY (t) | LOST SALES (K¥) | LOST GROSS PROFIT (K¥) | LOST GROSS PROFIT (K¥/t) | |
| (9.2) | 81,620,000 | 38,598,000 | 4190,000 | NON-PRODUCIBLE |
| (38.8) | 97,412,000 | 39,753,000 | 1024,000 | NON-PRODUCIBLE |
| (20.8) | 161,014,000 | 33,130,000 | 1591,000 | NON-PRODUCIBLE |
| (37.7) | 139,048,000 | 73,019,000 | 1939,000 | NON-PRODUCIBLE |
| (21.3) | 42,339,000 | 17,596,000 | 827,000 | NON-PRODUCIBLE |

FIG.15

| # | MANUFACTURING SITE | PROCESS | FACILITY | PRECONDITIONS ||||| SIMULATION RESULT ||||||
|---|---|---|---|---|---|---|---|---|---|---|---|---|---|---|
| | | | | ANNUAL FACILITY OPERATING TIME | MANPOWER COEFFICIENT | PRODUCTION VOLUME (t) | OPERATING RATE | REQUIRED OPERATING TIME (h) | REQUIRED IMPROVEMENT RATE | PRODUCED PRODUCT (○: NO NON-PRODUCIBLE PRODUCT, ●: NON-PRODUCIBLE) |||||
| | | | | | | | | | | PRODUCT 5 | PRODUCT 2 | PRODUCT 1 | PRODUCT 7 | PRODUCT 9 |
| 5 | JAPANESE FACTORY | A PROCESS | FACILITY 1 | 4,368 | 100% | 201.5 | 100% | 1,270 | 29% | | | ○ | | |
| 8 | | | FACILITY 2 | 4,368 | 100% | 133.6 | 100% | 1,270 | 29% | | ● | | | |
| 14 | | | FACILITY 3 | 3,888 | 100% | 129.8 | 100% | 340 | 9% | | | | | ● |
| 18 | | B PROCESS | FACILITY 1 | 5,824 | 30% | 48.5 | 100% | 1,586 | 27% | | ● | | | |
| 19 | | | FACILITY 2 | 5,824 | 30% | 49.7 | 100% | 1,494 | 26% | | ● | | | |
| 20 | | | FACILITY 3 | 5,824 | 30% | 43.7 | 100% | 1,606 | 28% | | ● | | | |
| 21 | | | FACILITY 4 | 5,824 | 30% | 48.5 | 100% | 1,586 | 27% | | ● | | | |
| 22 | | | FACILITY 5 | 5,824 | 30% | 51.4 | 100% | 1,606 | 28% | | ● | | | |
| 25 | | | FACILITY 6 | 4,368 | 75% | 590.2 | 100% | 609 | 14% | ● | | | ● | ● |
| 40 | FRENCH FACTORY | A PROCESS | FACILITY 1 | 4,248 | 100% | 678.6 | 100% | 134 | 3% | | | ● | | |
| 42 | | B PROCESS | FACILITY 1 | 4,248 | 100% | 960.5 | 100% | 104 | 2% | | | ● | | |

FIG.16

| PRODUCT 551 | ITEM 552 | CUSTOMER NAME 553 | SALES SITE 554 | DEMAND QUANTITY 555 | NON-PRODUCIBLE QUANTITY 556 | POST-MANNING SUPPLY QUANTITY 557 | IMPROVED PROFIT AMOUNT (K¥) 558 |
|---|---|---|---|---|---|---|---|
| PRODUCT 7 | ITEM 10 | CUSTOMER 1 | SITE A | 0.76 | 0.76 | 0.76 | 7,345,000 |
| PRODUCT 7 | ITEM 11 | CUSTOMER 2 | SITE A | 0.02 | 0.02 | 0.02 | 6,332,000 |
| PRODUCT 7 | ITEM 10 | CUSTOMER 3 | SITE A | 0.24 | 0.24 | 0.24 | 5,345,000 |
| PRODUCT 7 | ITEM 12 | CUSTOMER 4 | SITE A | 0.16 | 0.16 | 0.16 | 3,345,000 |
| PRODUCT 7 | ITEM 12 | CUSTOMER 5 | SITE A | 0.04 | 0.04 | 0.04 | 1,112,000 |
| PRODUCT 7 | ITEM 12 | CUSTOMER 6 | SITE C | 0.54 | 0.54 | 0.54 | 632,000 |
| PRODUCT 7 | ITEM 12 | CUSTOMER 7 | SITE C | 0.24 | 0.24 | 0.24 | 545,000 |
| PRODUCT 7 | ITEM 13 | CUSTOMER 8 | SITE C | 4.64 | 4.64 | 4.64 | 332,000 |

| # | Manufacturing Site | Process | Facility | Product 5 | Product 2 | Product 1 | Product 7 | Product 9 |
|---|---|---|---|---|---|---|---|---|
| 5 | Japanese Factory | A Process | Facility 1 | | | ○ | | |
| 8 | | | Facility 2 | | ● | | | |
| 14 | | | Facility 3 | | | | | ● |
| 18 | | B Process | Facility 1 | | ● | | | |
| 19 | | | Facility 2 | | ● | | | |
| 20 | | | Facility 3 | | ● | | | |
| 21 | | | Facility 4 | | ● | | | |
| 22 | | | Facility 5 | | ● | | | |
| 25 | | | Facility 6 | ● | | | | |
| 40 | French Factory | A Process | Facility 1 | | | ● | ● | ● |
| 42 | | B Process | Facility 1 | | | ● | | |

Produced Product (○: No non-producible product, ●: Non-producible)

FIG.17B

| SALES SITE | CUSTOMER NAME | MANUFACTURING SITE | PRODUCT | ITEM | QUANTITY | PROFIT/t |
|---|---|---|---|---|---|---|
| SITE A | CUSTOMER 1 | JAPANESE FACTORY | PRODUCT 5 | ITEM 1 | 0.4000 | 2346000 |
| SITE A | CUSTOMER 2 | JAPANESE FACTORY | PRODUCT 5 | ITEM 1 | 0.3000 | 1528000 |
| SITE D | CUSTOMER 3 | JAPANESE FACTORY | PRODUCT 5 | ITEM 1 | 0.0100 | 1146000 |
| SITE C | CUSTOMER 4 | JAPANESE FACTORY | PRODUCT 5 | ITEM 2 | 0.9000 | 712000 |
| SITE C | CUSTOMER 5 | JAPANESE FACTORY | PRODUCT 5 | ITEM 3 | 0.4000 | 71000 |

FIG. 17C

| ITEM | CUSTOMER NAME | SALES SITE | DEMAND QUANTITY | PROFIT AMOUNT/t | PRODUCT | NON-PRODUCIBLE QUANTITY |
|---|---|---|---|---|---|---|
| ITEM 10 | CUSTOMER 1 | SITE A | 0.76 | 7169000 | PRODUCT 7 | 0.76 |
| ITEM 11 | CUSTOMER 2 | SITE A | 0.02 | 6260000 | PRODUCT 7 | 0.02 |
| ITEM 10 | CUSTOMER 3 | SITE A | 0.24 | 5591000 | PRODUCT 7 | 0.24 |
| ITEM 12 | CUSTOMER 4 | SITE A | 0.16 | 5589000 | PRODUCT 7 | 0.16 |
| ITEM 12 | CUSTOMER 5 | SITE A | 0.04 | 4632000 | PRODUCT 7 | 0.04 |
| ITEM 12 | CUSTOMER 6 | SITE C | 0.54 | 2086000 | PRODUCT 7 | 0.54 |

FIG. 18A

| # | PRODUCT | ITEM | SALES SITE | MANUFACTURING SITE | | QUANTITY (t) |
|---|---|---|---|---|---|---|
| | | | | BEFORE CHANGE | AFTER CHANGE | |
| 1 | PRODUCT 4 | ITEM 1 | SITE E | JAPANESE FACTORY | CHINESE FACTORY | 0.4 |
| 2 | PRODUCT 4 | ITEM 2 | SITE E | JAPANESE FACTORY | CHINESE FACTORY | 1.3 |
| 3 | PRODUCT 5 | ITEM 3 | SITE C | CHINESE FACTORY | JAPANESE FACTORY | 0.1 |
| 4 | PRODUCT 6 | ITEM 4 | SITE C | JAPANESE FACTORY | FRENCH FACTORY | 4.8 |
| 5 | PRODUCT 7 | ITEM 5 | SITE C | CHINESE FACTORY | JAPANESE FACTORY | 35.2 |
| 6 | PRODUCT 7 | ITEM 6 | SITE B | CHINESE FACTORY | JAPANESE FACTORY | 59.2 |
| 7 | PRODUCT 8 | ITEM 7 | SITE B | CHINESE FACTORY | FRENCH FACTORY | 11.4 |

FIG. 18B

| CHANGE PATTERN | DEVIATION AT TIME OF PRODUCTION PLACE CHANGE (TARGET ITEM) | | | | DEVIATION AT TIME OF PRODUCTION PLACE CHANGE (OVERALL) | | |
|---|---|---|---|---|---|---|---|
| | MANUFACTURING COST (K¥/t) | | | | SALES (K¥) | GROSS PROFIT (K¥) | SUPPLY QUANTITY (t) |
| | | MATERIAL COST | SHIPPING COST | CUSTOMS DUTY | | | |
| MANUFACTURING COST REDUCTION/ INVENTORY UTILIZATION | -1,240000 | -1,240000 | | | ±0 | +445000 | ±0 |
| MANUFACTURING COST REDUCTION | -267000 | +19000 | -63000 | -222000 | ±0 | +368000 | ±0 |
| MANUFACTURING COST REDUCTION | -298000 | | +12000 | -308000 | ±0 | +17000 | ±0 |
| MANUFACTURING COST REDUCTION | -54000 | -18000 | -54000 | +5000 | ±0 | +258000 | ±0 |
| MANUFACTURING COST REDUCTION | -11000 | | +2000 | +12000 | ±0 | +456000 | ±0 |
| MANUFACTURING COST REDUCTION | -26000 | -31000 | -7000 | -18000 | ±0 | +1,120000 | ±0 |
| MANUFACTURING COST REDUCTION | -31000 | -29000 | +16000 | | ±0 | +530000 | ±0 |

FIG.19D
FEATURE 3
VISUALIZE QUANTITATIVE ESTIMATION
RESULT FOR DECISION-MAKING PROCESS
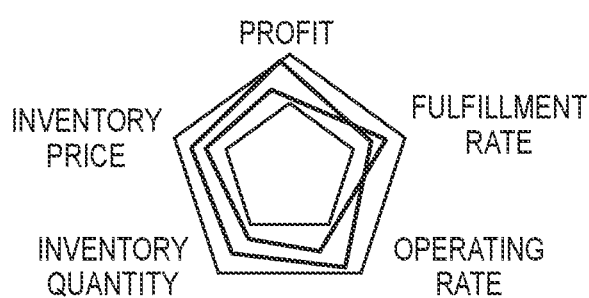
ESTIMATION RESULT
CONSENSUS BUILDING BASED ON
OBJECTIVE EVIDENCE IS PROMOTED

MANUFACTURE AND SALES STRATEGY PLANNING METHOD AND DEVICE THEREOF

CROSS-REFERENCE TO PRIOR APPLICATION

This application relates to and claims the benefit of priority from Japanese Patent Application number 2020-115752, filed on Jul. 3, 2020 the entire disclosure of which is incorporated herein by reference.

BACKGROUND

The present invention generally relates to a manufacture and sales strategy planning method and device for planning a manufacture and sales strategy of a product to be manufactured and sold.

When devising a production plan and a sales plan of a product to be manufactured and sold, it is necessary to give consideration to the production capacity of the production factory to produce the product, and to the demand of the product. Here, in a mode including a plurality of production lines, when reviewing the production plan according to the demand fluctuation, proposed is a device which enables the review of the production plan according to the demand fluctuation while minimizing the change of assignment of the product to be produced and the production line (refer to PTL 1). Moreover, proposed is a device which coordinates the resources of a plurality of factory groups, and utilizes the resources of the plurality of factory groups, as a whole, when distributing the product manufacturing process to the respective factories (refer to PTL 2).

[PTL 1] Japanese Unexamined Patent Application Publication No. 2009-116780

[PTL 2] Japanese Unexamined Patent Application Publication No. 2019-8501

SUMMARY

When producing a multi-item product, it is necessary to incorporate a sales strategy that suits each item in order to formulate an action plan related to each item. Thus, it is difficult to formulate an action plan and, depending on the contents of the action plan, the risk of deteriorating the profitability will increase. Specifically, it is necessary to plan a manufacture and sales strategy in product units in which items are consolidated and having a profound improvement effect from the perspective of profits. Furthermore, in order to actually implement each manufacture and sales strategy, it is important that each manufacture and sales strategy includes specific contents in item units giving consideration to on-site restrictions. Nevertheless, when attempting to compare the contents of each manufacture and sales strategy, there are numerous parameters to be considered, and, because this is dependent on human know-how, it is difficult to easily plan a manufacture and sales strategy which improves profits.

An object of the present invention is to plan a manufacture and sales strategy which improves the business KGI (Key Goal Indicator), such as profits, according to the availability of the spare production capacity for each item configuring a specific product among a plurality of products.

In order to achieve the foregoing object, the present invention provides manufacture and sales strategy planning method, comprising: a spare production capacity determination step of determining, based on information related to a sales plan of a plurality of products and a production capacity of a production facility to produce each of the plurality of products, whether there is any spare capacity in the production capacity of the production facility in relation to the sales plan for each of the products; an improvement effect calculation step of applying one among a plurality of profit improvement strategies, according to an availability of the spare capacity, to each of the products in which the availability of the spare capacity has been determined in the spare production capacity determination step, and calculating an improvement effect of each of the products to which each of the profit improvement strategies has been applied; a product selection step of selecting, based on each calculation result obtained in the improvement effect calculation step, a specific product among the plurality of products in which the improvement effect has exceeded a set value with regard to each of the plurality of profit improvement strategies; an item extraction step of extracting, for each of the profit improvement strategies, an item which satisfies a restricting condition of sale or production of the specific product set in the product selection step and which configures the specific product; and a manufacture and sales strategy selection step of planning a manufacture and sales strategy related to the items extracted in the item extraction step, and selecting one or more specific item strategies based on the improvement effect, wherein a supply and demand plan is simulated by reflecting the improvement effect of the selected strategy.

According to the present invention, it is possible to plan a manufacture and sales strategy for improving the profit according to the availability of the spare production capacity for each item configuring a specific product among a plurality of products.

BRIEF DESCRIPTION OF THE DRAWINGS

FIG. 5A is a configuration diagram of the product-based excess/deficiency improvement effect management table according to this embodiment.

FIG. 5B is a configuration diagram of another product-based excess/deficiency improvement effect management table according to this embodiment.

FIG. 8A is a configuration diagram of the product-based excess/deficiency improvement effect management table according to this embodiment.

FIG. 8B is a configuration diagram of the product order selection list according to this embodiment.

FIG. 9 is a configuration diagram of the sales increase, selling price change effect management table according to this embodiment.

FIG. 10 is a configuration diagram of the product, process-based spare capacity management table according to this embodiment.

FIG. 14 is a configuration diagram of the product-based excess/deficiency improvement effect management table according to this embodiment.

FIG. 15 is a configuration diagram of the bottleneck facility management table according to this embodiment.

FIG. 16 is a configuration diagram of the bottleneck improvement item candidate extraction list according to this embodiment.

FIG. 17A is a configuration diagram of the high/low profit product swap item management table according to this embodiment.

FIG. 17B is a configuration diagram of the swap candidate extraction list according to this embodiment.

FIG. 17C is a configuration diagram of the non-producible product extraction list according to this embodiment.

FIG. 18A is a part of a configuration diagram of the production site change item management table according to this embodiment.

FIG. 18B is the other part of the configuration diagram of the production site change item management table according to this embodiment.

FIG. 19D is the other part of the explanatory diagram showing the overall image of the solution according to this embodiment.

DESCRIPTION OF EMBODIMENTS

Figure 1:
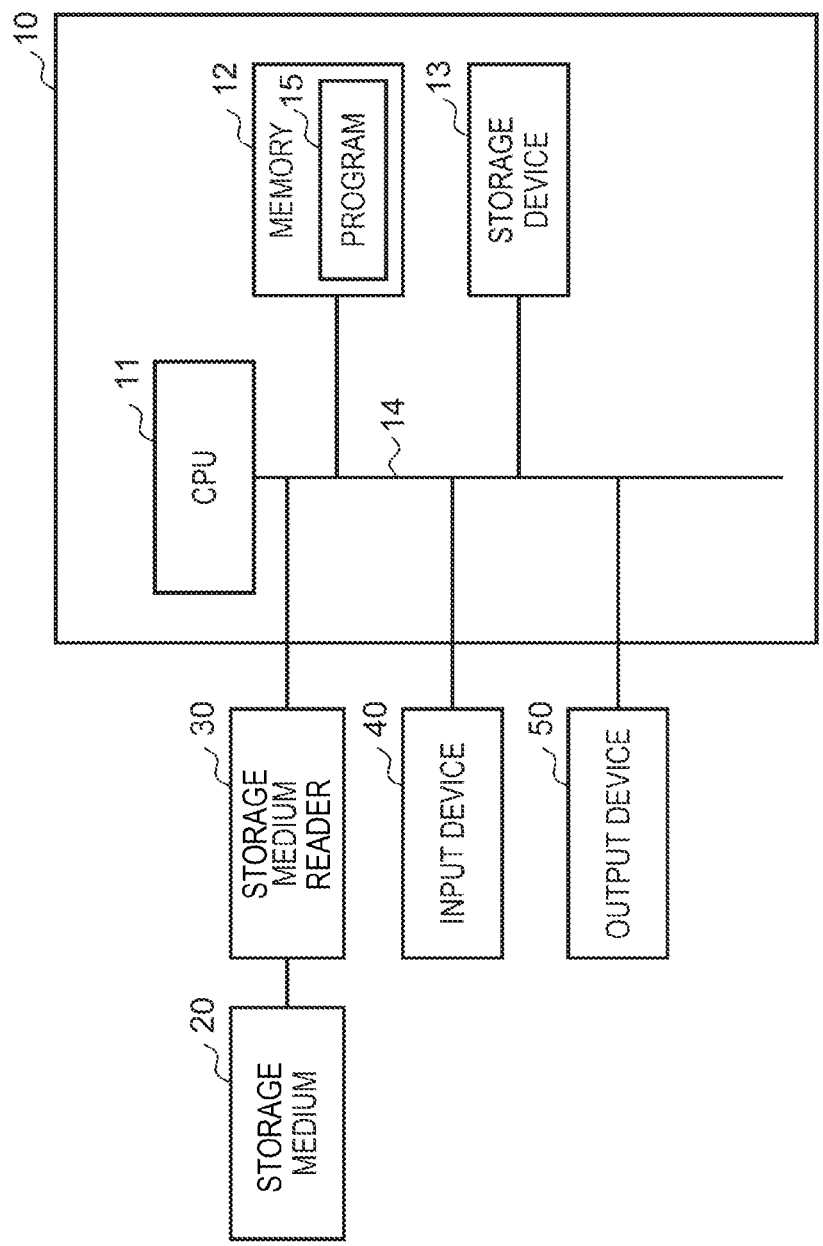
FIG. 1 is a configuration diagram of the hardware resources of the manufacture and sales strategy planning system according to this embodiment.

FIGS. 19A, 19B, 19C and 19D are an explanatory diagram showing the overall image of a manufacture and sales strategy plan/supply and demand plan simulator. The manufacture and sales strategy plan/supply and demand plan simulator 1, by inputting the current demand and the manufacture and sales strategy of a plurality of sites as a scenario 2 and executing optimization simulation which gives consideration to the customer characteristics and the facility capacity based on the input scenario 2, automatically devises a manufacture/sales plan which improves the profit, outputs the devised plan to an output device 3 as the optimized manufacture/sales plan evaluation result, and can thereby promptly provide the devised plan to the user. Here, by simulating a strategy scenario pattern only with the setting of parameters, it is possible to easily estimate the manufacture/sales strategy scenario (feature 1). Moreover, by comprising a master capable of setting a variety of sale/production restrictions and an original optimization model, it is possible to evaluate the supply chain and automatically devise a profit-maximizing manufacture/sales plan (feature 2). Furthermore, by visualizing a quantitative estimation result for the decision-making process, it is possible to promote consensus building based on objective evidence (feature 3).

An embodiment of the present invention is now explained with reference to the appended drawings.

FIG. 1 is a configuration diagram of the hardware resources of the manufacture and sales strategy planning system according to this embodiment. In FIG. 1, the manufacture and sales strategy planning system comprises a manufacture and sales strategy planning device 10, a storage medium 20, a storage medium reader 30, an input device 40, and an output device 50, and the storage medium reader 30, the input device 40 and the output device 50 are respectively connected to the manufacture and sales strategy planning device 10.

The manufacture and sales strategy planning device 10 is a computer device comprising a CPU (Central Processing Unit) 11, a memory 12, and a storage device 13, and the CPU 11, the memory 12 and the storage device 13 are connected via a bus 14.

The CPU 11 is configured as a central processing unit which governs the control of the overall operation of the device. The memory 12 is a storage medium storing programs 15 to be executed by the CPU 11. The storage device 13 is configured from a storage medium such as a RAM (Random Access Memory) and a ROM (Read Only Memory).

The storage medium 20 is a storage device for storing various types of information related to the production facility and customers, and is configured, for example, from a hard disk device, a semiconductor memory device, an optical disc device, a magneto optical disc device, a magnetic tape device, or a flexible disk device. The storage medium reader 30 reads information recorded in the storage medium 20, and outputs the read information to the manufacture and sales strategy planning device 10. The input device 40 is configured from a keyboard or a mouse. The output device 50 is configured from a display which displays information or a printer which outputs information.

Figure 2:
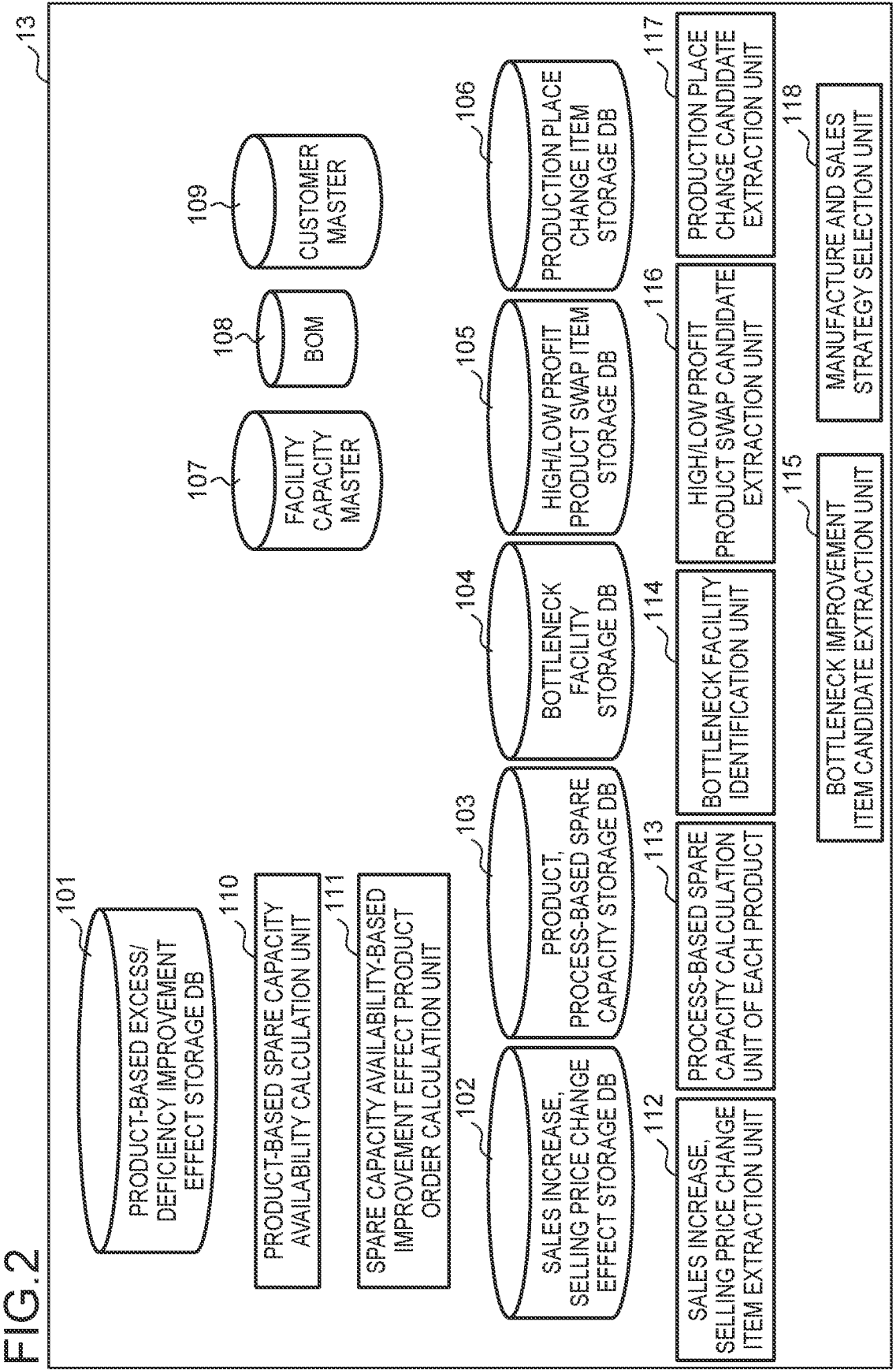
FIG. 2 is a configuration diagram of the software resources of the manufacture and sales strategy planning device according to this embodiment.

FIG. 2 is a configuration diagram of the software resources of the manufacture and sales strategy planning device according to this embodiment. In FIG. 2, the storage device 13 stores, as databases for managing various types of data, a product-based excess/deficiency improvement effect storage DB (database) 301, a sales increase, selling price change effect storage DB 102, a product, process-based spare capacity storage DB 103, bottleneck facility storage DB 104, a high/low profit product swap item storage DB 105, a production site change item storage DB 106, a facility capacity master 107, a BOM (Bill Of Materials) 108, and a customer master 109.

The facility capacity master 107 stores information related to the production capacity of the production facility by production site (factory) and by process. The BOM 108 stores the components (parts) as products configuring the merchandise (commodity) to be manufactured and sold and the items configuring the respective products, information related to the restricting condition of sale or production of each product or the transporting condition of each product, and information related to the cost of each product and each item. The customer master 109 stores information such as the customer name, sales site, products sold, items sold, and standard (pre-strategy) selling price of a plurality of customers.

The storage device 13 stores a product-based spare capacity availability calculation unit 110, a spare capacity availability-based improvement effect product order calculation unit 111, a sales increase, selling price change item extraction unit 112, a process-based spare capacity calculation unit of each product 113, a bottleneck facility identification unit 114, a bottleneck improvement item candidate extraction unit 115, a high/low profit product swap candidate extraction unit 116, a production site change candidate extraction unit 117, and a manufacture and sales strategy selection unit 118. These units are programs that are read into the memory 12, and function as programs that are executed by the CPU 11. For example, the product-based spare capacity availability calculation unit 110 functions as a spare production capacity determination unit (spare production capacity determination program) which determines, by product, whether there is any spare capacity in the production capacity of the production facility in relation to the sales plan based on information related to the current sales plan (sale quantity, selling price) of a plurality of products input by the user or which reflects the strategy, information such as the customer name and the sales site and standard selling price to such customer among the information stored in the customer master 109, and information stored in the facility capacity master 107 which is information related to the production capacity of the production facility to produce each of the plurality of products.

Moreover, the spare capacity availability-based improvement effect product order calculation unit 111 functions as an improvement effect calculation unit (improvement effect calculation program) which applies one among a plurality of profit improvement strategies (sales increase strategy, discount/spot sales increase strategy, bottleneck facility/process improvement strategy, profit perspective/sales perspective-based swap strategy, production site change strategy), according to the availability of the spare capacity (spare production capacity), to each of the products in which the availability of the spare capacity has been determined by the spare production capacity determination unit, and calculates the improvement effect of each of the products to which the one profit improvement strategy has been applied, and additionally functions as a product selection unit (product selection program) which selects, based on each calculation result of the improvement effect calculation unit, a specific product among each of the products in which the improvement effect has exceeded a set value with regard to each of the plurality of profit improvement strategies. The specific function of each program and the specific content of each DB 101 to 106 will be explained later.

Figure 3:
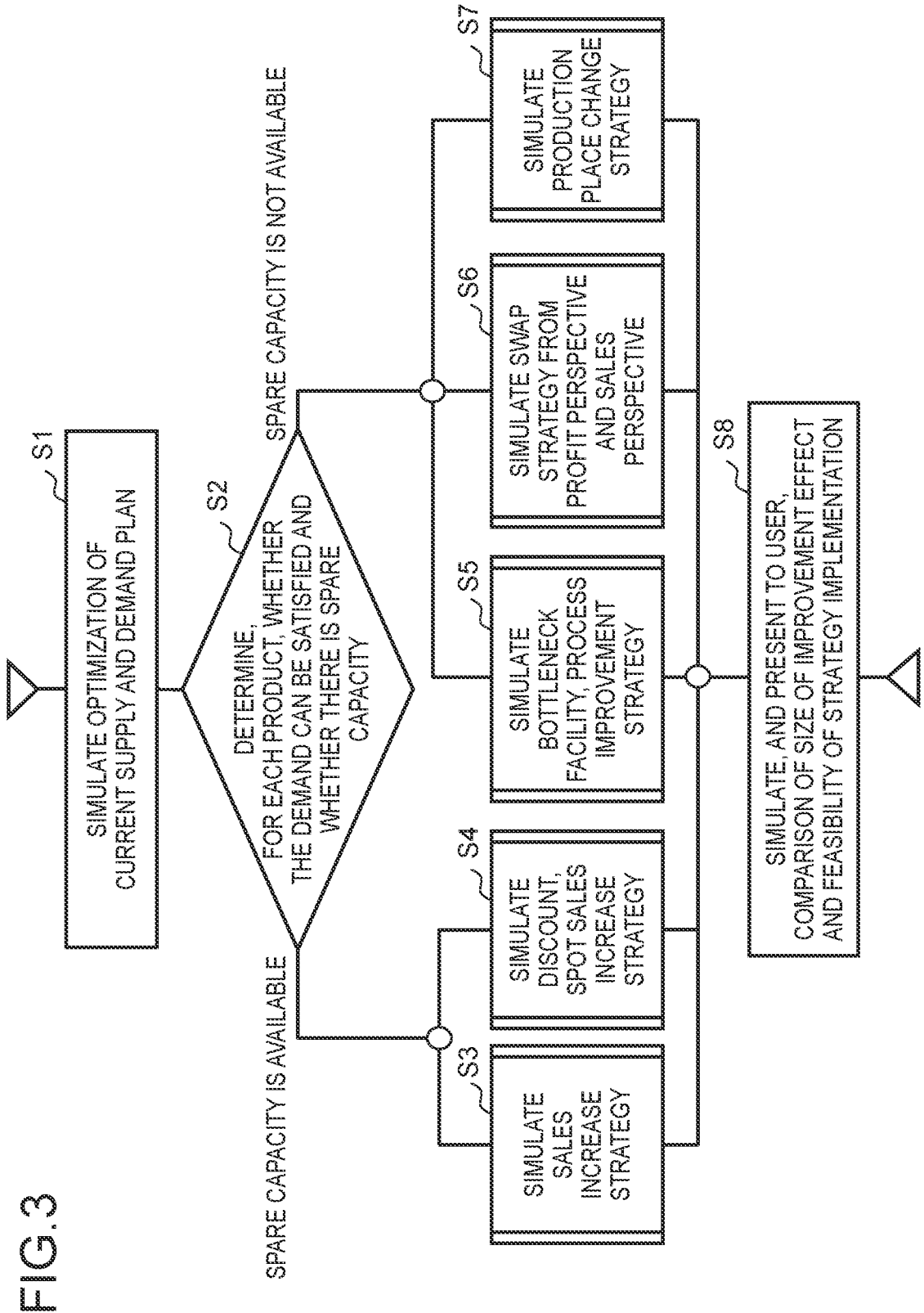
FIG. 3 is a flowchart showing the processing of the overall manufacture and sales strategy planning system according to this embodiment.

FIG. 3 is a flowchart showing the processing of the overall manufacture and sales strategy planning system according to this embodiment. In FIG. 3, when the storage medium reader 30 reads the information recorded in the user's storage medium 20, the CPU 11 inputs the information read by the storage medium reader 30 as the information related to the user's current sales plan, executes a current supply and demand plan optimization simulation based on the input information, and information respectively stored in the facility capacity master 107, the BOM 108 and the customer master 109, and executes the determination of producibility/non-producibility (S1).

Next, the CPU 11 determines, for each product, whether the demand can be satisfied and whether there is spare capacity (spare production capacity) based on the processing result of step S1 (S2). When a positive determination result is obtained in step S2; that is, when a determination result of "spare capacity is available" is obtained, the CPU 11 proceeds to the processing of steps S3 and S4 as the processing of selecting the tendency level strategy in product units. The CPU 11 simulates the sales increase strategy in step S3 and simulates the discount, spot sales increase strategy in step S4, and thereafter proceeds to the processing of step S8.

Meanwhile, when a negative determination result is obtained in step S2; that is, when a determination result of "spare capacity (spare production capacity) is not available" is obtained, the CPU 11 proceeds to the processing of steps S5, S6, and S7 as the processing to be performed in the occurrence of a non-producible product. The CPU 11 simulates the bottleneck facility, process improvement strategy in step S5, simulates the swap strategy from a profit perspective and a sales perspective in step S6, and simulates the production site change strategy in step S7, and thereafter proceeds to the processing of step S8.

After performing the processing of steps S3 to S7, the CPU 11 activates the manufacture and sales strategy selection unit 118, plans a manufacture and sales strategy related to the plurality of items extracted by the sales increase, selling price change item extraction unit 112, creates a list of the manufacture and sales strategies planned for all items, and displays the content of the listed manufacture and sales strategy of each item on the screen of the output device 50 so as to simulate, and present to the user, the comparison of size of the improvement effect and the feasibility of the strategy implementation (S8), and thereafter ends the processing of this routine. Here, the CPU 11 can simulate the overall effect based on the item strategy to be implemented, target customer, and strategy combination received from the user and display the simulation result on the screen of the output device 50, and thereby present the overall effect to the user. Note that the CPU 11 can also repeat the processing of steps S1 to S8 based on the user's operation.

Figure 4:
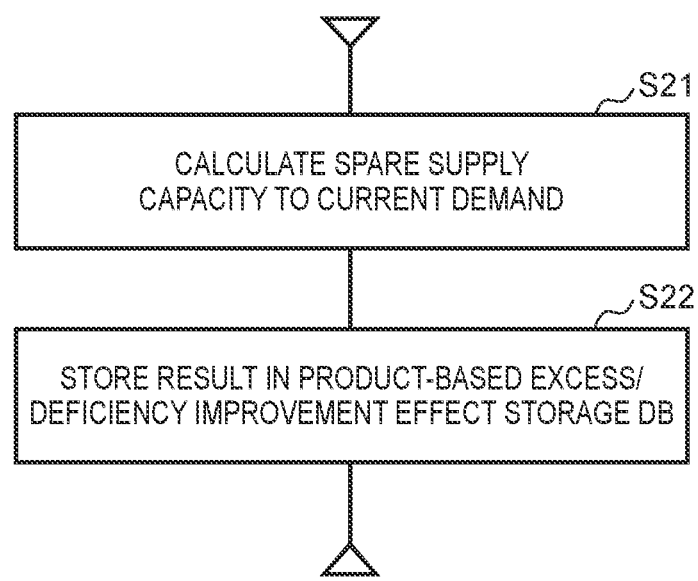
FIG. 4 is a flowchart for explaining the processing of the product-based spare capacity availability calculation unit according to this embodiment.

FIG. 4 is a flowchart for explaining the processing of the product-based spare capacity availability calculation unit according to this embodiment. This processing is the specific content of step S2, and is started as a result of the CPU 11 activating the product-based spare capacity availability calculation unit 110. In FIG. 4, the product-based spare capacity availability calculation unit 110 extracts the manufacturing pattern on a supply chain which will maximize the profits by using an optimization method such as linear programming or quadratic programming, with the objective function being maximum profits or the like, based on the processing result of step S1, calculates the spare supply capacity (or spare production capacity) in relation to the current demand by product or by factory based on the extracted manufacturing pattern, and classifies the respective products as a product in which spare capacity is available or a product in which spare capacity is not available based on the calculation result (S21). The product-based spare capacity availability calculation unit 110 can classify, among the plurality of products, "product 1", "product 2", and "product 3" as products in which spare capacity is available, and "product 4", "product 5", "product 6", "product 7", and "product 8" as products in which spare capacity is not available.

Next, the product-based spare capacity availability calculation unit 110 stores the processing result of step S21 in the product-based excess/deficiency improvement effect storage DB 101 (S22), and then ends the processing of this routine.

FIG. 5A is a configuration diagram of the product-based excess/deficiency improvement effect management table according to this embodiment. In FIG. 5A, the product-based excess/deficiency improvement effect management table 200 is the processing result of step S2 (steps S21 and S22) and is a table for managing information in cases where spare capacity is available, comprises the items of # (number) 201, product name 202, spare capacity 203, and determination 204, and is stored in the product-based excess/deficiency improvement effect storage DB 101. Moreover, the spare capacity 203 is configured from a suppliable quantity (t) 205, a sales deviation upon supply (K¥) 206, and a gross profit deviation upon supply (K¥) 207.

The # (number) 201 stores information related to numbers. The product name 202 is information for uniquely identifying a product among multiple products, and stores, for example, "product 1", "product 2", and "product 3" as the products in which spare capacity is available. The spare capacity 203 stores information of the suppliable quantity (t) 205, the sales deviation upon supply (K¥) 206, and the gross profit deviation upon supply (K¥) 207. The suppliable quantity 205 stores information of the supply quantity that can be supplied based on the spare capacity after the current demand (sales plan) of each product is satisfied, and additionally stores breakdown information of the supply quantity that can be supplied by a Japanese factory 208, a Chinese factory 209, and a French factory 210, respectively. The sales deviation upon supply (K¥) 206 stores information of the sales deviation upon supply, and the gross profit deviation upon supply (K¥) 207 stores information of the gross profit deviation upon supply. The determination 204 stores, for example, information of "spare capacity is available" as the determination result.

FIG. 5B is a configuration diagram of another product-based excess/deficiency improvement effect management table according to this embodiment. In FIG. 5B, the product-based excess/deficiency improvement effect management table 250 is the processing result of step S2 (steps S21 and S22) and is a table for managing information in cases where spare capacity is not available, comprises the items of # (number) 251, product 252, demand quantity (t) 253, supply quantity (t) 254, supply quantity breakdown 255, sales (K¥) 256, gross profit (K¥) 257, gross profit ratio 258, non-producible 259, and determination 260, and is stored in the product-based excess/deficiency improvement effect storage DB 101. Moreover, the supply quantity breakdown 255 is divided into a Japanese factory 261, a Chinese factory 262, and a French factory 263. The non-producible 259 is divided into a non-producible quantity (t) 264, lost sales (K¥) 265, a lost gross profit (K¥) 266, and a lost gross profit (K¥/t) 267.

The # (number) 251 stores information related to numbers. The product 252 is information for uniquely identifying a product among multiple products, and stores, for example, "product 4", "product 5", "product 6", "product 7", and "product 8" as the products in which spare capacity is not available. The demand quantity (t) 253 stores information indicating the demand quantity of the product. The supply quantity (t) 254 stores information indicating the supply quantity of the product. The supply quantity breakdown 255 stores information of the supply quantity that can be supplied in relation to the current demand (sales plan) from the respective factories (Japanese factory 261, Chinese factory 262, French factory 263). The sales (K¥) 256 stores information indicating the sales upon supplying and selling the product. The gross profit (K¥) 257 stores information indicating the gross profit upon selling the product. The gross profit ratio 258 stores information indicating the ratio of the gross profit upon selling the product. The non-producible quantity (t) 264 of the non-producible 259 stores information indicating the quantity of the product that cannot be produced in relation to the current demand (sales plan). The lost sales (K¥) 265 stores information indicating the lost sales based on the quantity of the product that cannot be produced. The lost gross profit (K¥) 266 stores information indicating the lost gross profit based on the quantity of the product that cannot be produced. The lost gross profit (K¥/t) 267 stores information indicating the lost gross profit per ton based on the quantity of the product that cannot be produced. The determination 260 stores, for example, information of "non-producible" indicating that a part or the whole of the product cannot be produced.

Figure 6A:
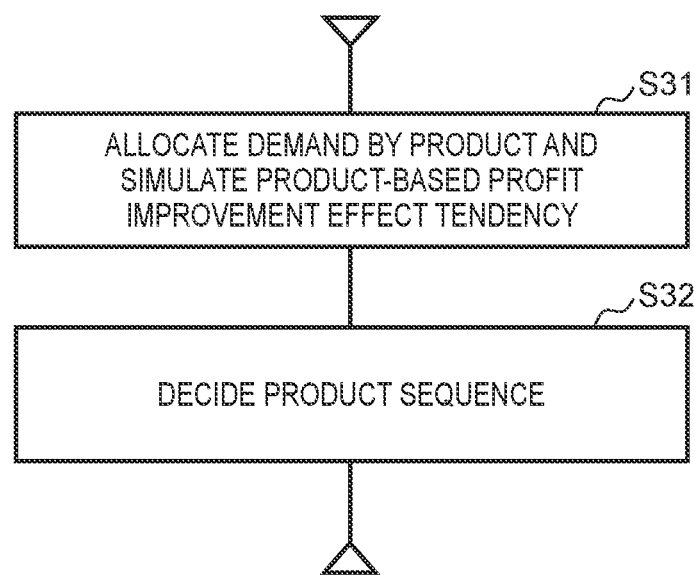
FIG. 6A is a flowchart for explaining the processing of the spare capacity availability-based improvement effect product order calculation unit according to this embodiment.

FIG. 6A is a flowchart for explaining the processing of the spare capacity availability-based improvement effect product order calculation unit according to this embodiment. This processing is the specific content of step S3, and is started as a result of the CPU 11 activating the spare capacity availability-based improvement effect product order calculation unit 111. In FIG. 6A, the spare capacity availability-based improvement effect product order calculation unit 111 applies the sales increase strategy as the first profit improvement strategy to each product in which "spare capacity is available" was determined, and calculates the improvement effect of each product. Specifically, the spare capacity availability-based improvement effect product order calculation unit 111 allocates the demand by product based on the processing result of steps S21 and S22 and simulates the product-based profit improvement effect tendency, and selects the product order to which a strategy should be plotted from the "product-based profitability upon utilizing spare capacity (amount, rate)" (S31). As the method of allocating (method of testing the demand in a plurality of patterns) a parameter, such as the demand, having a significant influence on the profit improvement strategy, "by sales site", "by facility having an influence on the manufacturing cost" and the like may be combined and allocated. Moreover, as the perspective of selecting the product order, the product order may also be selected based on the profitability per "manufacture unit quantity", "same unit time", or "unit % within manufacturing framework". Furthermore, as a parameter having a significant influence on the profit improvement strategy, in addition to "demand (sales volume)", also used may be "selling price", "manufacturing cost", "operating rate" or the like.

Next, the spare capacity availability-based improvement effect product order calculation unit 111 decides the product sequence based on the processing result of step S31 and the information stored in the product-based excess/deficiency improvement effect storage DB 101, stores the information of the decided content in the sales increase, selling price change effect storage DB 102 by product and by customer, and additionally stores the information of the decided content in the product, process-based spare capacity storage DB 103 (S32), and then ends the processing of this routine.

Here, the spare capacity availability-based improvement effect product order calculation unit 111 functions as the improvement effect calculation unit which applies the sales increase strategy to each product in which "spare capacity is available" was determined, and calculates the improvement effect of each product to which the sales increase strategy was applied, and additionally functions as the production selection unit which selects a specific product among the respective products in which the improvement effect has exceeded a set value (for example, the product ranked first in terms of the improvement effect) with regard to the sales increase strategy.

Figure 6B:
FIG. 6B is a flowchart for explaining the processing related to the sales increase strategy of the sales increase, selling price change item extraction unit or the product, process-based spare capacity calculation unit according to this embodiment.

FIG. 6B is a flowchart for explaining the processing related to the sales increase strategy of the sales increase, selling price change item extraction unit or the product, process-based spare capacity calculation unit according to this embodiment. This processing is the specific content of step S3, and is started as a result of the CPU 11 activating the sales increase, selling price change item extraction unit 112 or the product, process-based spare capacity calculation unit 113. In FIG. 6B, the sales increase, selling price change item extraction unit 112 or the product, process-based spare capacity calculation unit 113 identifies the item strategy and customer from the size of the profit amount based on the processing result of steps S21 and S22 (S33), and then ends the processing of this routine.

Note that, in step 33, the item strategy and the customer may also be identified based on the profit amount per unit. Moreover, in the case of processing manufacturing such as chemical manufacturing, since there are cases where the product is sold as a manufactured article midway during the process, a step of confirming in advance the spare operating capacity in each manufacturing site and manufacturing process may also be inserted into the routine.

Figure 7A:
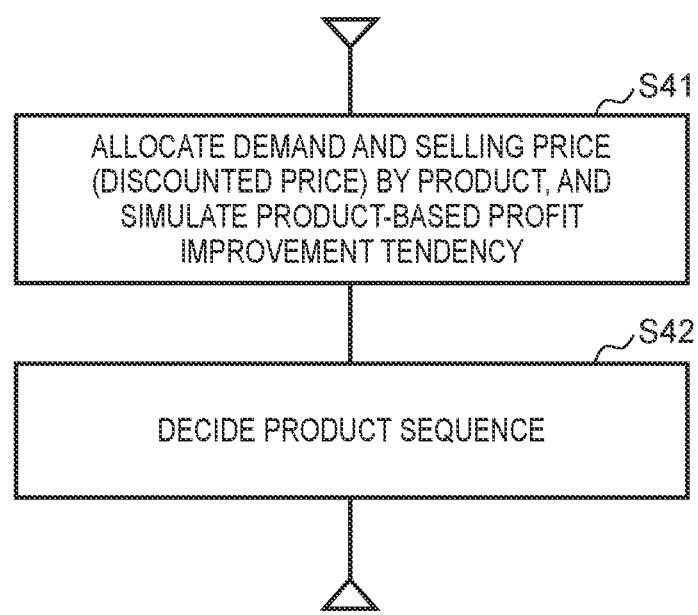
FIG. 7A is a flowchart for explaining the processing of the spare capacity availability-based improvement effect product order calculation unit according to this embodiment.

FIG. 7A is a flowchart for explaining the processing of the spare capacity availability-based improvement effect product order calculation unit according to this embodiment. This processing is the specific content of step S4, and is started as a result of the CPU 11 activating the spare capacity availability-based improvement effect product order calculation unit 111. In FIG. 7A, the spare capacity availability-based improvement effect product order calculation unit 111 applies the discount/spot sales increase strategy as the second profit improvement strategy to each product in which "spare capacity is available" was determined, and calculates the improvement effect of each product. Specifically, the spare capacity availability-based improvement effect product order calculation unit 111 allocates the selling price (discounted price), in addition to the demand, by product based on the processing result of steps S21 and S22 and simulates the product-based profit improvement effect tendency, and selects the product order to which a strategy should be plotted from the "product-based profitability upon utilizing spare capacity (amount, rate)" (S41). Note that, as the method of allocating the demand and the like, "by sales site", "by facility having an influence on the manufacturing cost" and the like may also be combined. Moreover, as the perspective of selecting the product order, the product order may also be selected based on the profitability per "manufacture unit quantity", "same unit time", or "unit % within manufacturing framework".

Next, the spare capacity availability-based improvement effect product order calculation unit 111 decides the product sequence based on the processing result of step S41 and the information stored in the product-based excess/deficiency improvement effect storage DB 101, stores the information of the decided content in the sales increase, selling price change effect storage DB 102 by product and by customer, and additionally stores the information of the decided content in the product, process-based spare capacity storage DB 103 (S42), and then ends the processing of this routine. Here, the spare capacity availability-based improvement effect product order calculation unit 111 functions as the improvement effect calculation unit which applies the discount/spot sales increase strategy to each product in which "spare capacity is available" was determined, and calculates the improvement effect of each product to which the discount/spot sales increase strategy was applied, and additionally functions as the product selection unit which selects a specific product among the respective products in which the improvement effect has exceeded a set value (for example, the product ranked first in terms of the improvement effect) with regard to the discount/spot sales increase strategy.

Figure 7B:
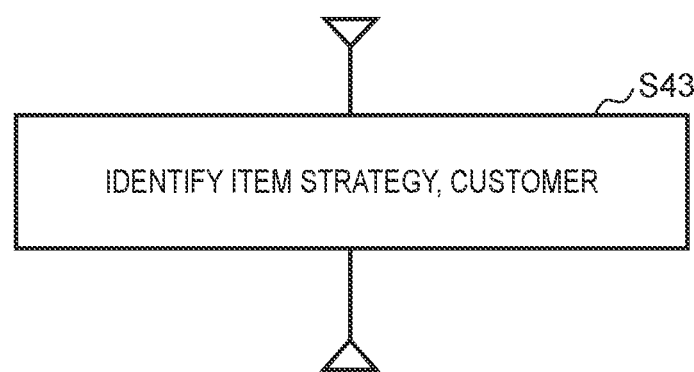
FIG. 7B is a flowchart for explaining the processing related to the discount/spot sales increase strategy of the sales increase, selling price change item extraction unit or the product, process-based spare capacity calculation unit according to this embodiment.

FIG. 7B is a flowchart for explaining the processing related to the discount/spot sales increase strategy of the sales increase, selling price change item extraction unit or the product, process-based spare capacity calculation unit according to this embodiment. This processing is the specific content of step S4, and is started as a result of the CPU 11 activating the sales increase, selling price change item extraction unit 112 or the product, process-based spare capacity calculation unit 113. In FIG. 7B, the sales increase, selling price change item extraction unit 112 or the product, process-based spare capacity calculation unit 113 identifies the item strategy and customer from the size of the profit amount based on the processing result of steps S21 and S22 (S43), and then ends the processing of this routine.

Note that, in step 43, the expression "per unit" is, for example, an index for measuring the efficiency of the improved earnings that can be efficiently gained when 1 ton of the product is manufactured, and is effective as an index of spot sales. Nevertheless, this may also be viewed in terms of the simple profit amount. Moreover, in the case of processing manufacturing such as chemical manufacturing, since there are cases where the product is sold as a manufactured article midway during the process, a step of confirming in advance the spare operating capacity in each manufacturing site and manufacturing process may also be inserted into the routine.

FIG. 8A is a configuration diagram of the product-based excess/deficiency improvement effect management table according to this embodiment. In FIG. 8A, the product-based excess/deficiency improvement effect management table 200 is the processing result of step S31 and is a table for managing information in cases where the spare capacity is available, comprises the items of # (number) 201, product name 202, spare capacity 203, and determination 204, and is stored in the product-based excess/deficiency improvement effect storage DB 101. Moreover, the spare capacity 203 is configured from a suppliable quantity (t) 205, a sales deviation upon supply (K¥) 206, and a gross profit deviation upon supply (K¥) 207. The information stored in the product-based excess/deficiency improvement effect management table 200 is the same as the information stored in the product-based excess/deficiency improvement effect management table 200 shown in FIG. 5A.

Here, the spare capacity availability-based improvement effect product order calculation unit 111 can decide, for example, from the perspective of the gross profit deviation upon supply (K¥) 207, "product 1" as the first rank, "product 2" as the second rank, and "product 3" as the third rank in terms of the sequence of products having a significant improvement effect. Note that, here, also in relation to the processing result of step S41, the sequence of products can be decided from the same output (FIG. 8A) by allocating the selling price in addition to the demand. Furthermore, it is also possible to output "gross profit deviation (K¥) upon supply per ton" to FIG. 8A, and decide the sequence of products based on the significance of the improvement effect thereof.

FIG. 8B is a configuration diagram of the product order selection list according to this embodiment. In FIG. 8B, the product order selection list 280 is a list for managing the processing result of step S31, and is configured from the items of sensitivity analysis 281, profit (M) 282, profit ratio (%) 283, production ton unit profit (MWt) 284, facility occupancy time unit profit (Wh) 285, facility operating rate unit profit (MW %) 286, sales (M) 287, and manufacturing cost (M) 288. The product order selection list 280 stores information for adopting, as the allocation method when taking the demand as an example, the method of allocating the demand by facility which influences the sales site, product and manufacturing cost, and visualizing the influence on the profit.

For example, the sensitivity analysis 281 stores information indicating the result of the sensitivity analysis when the demand is increased by 10% by facility which influences the sales site, product and manufacturing cost. The profit (M) 282 stores information indicating the profit when the demand is increased by 10% by facility which influences the sales site, product and manufacturing cost. The profit ratio (%) 283 stores information which indicates the profit ratio when the demand is similarly increased by 10% by facility. The production ton unit profit (MWt) 284 stores information which indicates the unit profit per production ton when the demand is similarly increased by 10% by facility. The facility occupancy time unit profit (Wh) 285 stores information which indicates the unit profit of the facility occupancy time when the demand is similarly increased by 10% by facility. The facility operating rate unit profit (MW %) 286 stores information which indicates the unit profit of the facility operating rate when the demand is similarly increased by 10% by facility. The sales (M) 287 stores information indicating the sales when the demand is similarly increased by 10% by facility. The manufacturing cost (M) 288 stores information indicating the manufacturing cost when the demand is similarly increased by 10% by facility. Note that the information of the product order selection list 280 is displayed on the screen of the output device 50.

Here, when deciding the products having a significant improvement effect based on the information recorded in the product order selection list 280, the spare capacity availability-based improvement effect product order calculation unit 111 can decide, for example, sales site A, product 2 and facility classification I recorded in the first line as the first rank in terms of profit amount, sales site A, product 1 and facility classification I recorded in the third line as the first rank in terms of profit ratio, and sales site D, product 3 and facility classification I recorded in the eleventh line as the first rank in terms of profit amount per production ton. Note that, here, also in relation to the processing result of step S41, the product order selection list can be decided from the same output (FIG. 8B) by allocating the selling price in addition to the demand.

FIG. 9 is a configuration diagram of the sales increase, selling price change effect management table according to this embodiment. In FIG. 9, the sales increase, selling price change effect management table 300 is the processing result of step S33 or step 43 and is a table for managing the extraction result of the sales increase, selling price change item, comprises the items of item name, process 301, customer name 302, sales site 303, demand quantity 304, supply quantity 305, sales 306, product 307, gross profit 308, gross profit ratio 309, and gross profit/t 310, and is stored in the sales increase, selling price change effect storage DB 102.

The item name, process 301 stores information related to the item name of the item to be sold and the process that produced the item. The customer name 302 stores information of the customer name to become the sales destination of the item. The sales site 303 stores information indicating the sales site of the item. The demand quantity 304 stores information indicating the demand quantity of the item. The supply quantity 305 stores information indicating the supply quantity of the item. The sales 306 stores information indicating the amount of sales of the item. The product 307 stores information for identifying the product of the item. The gross profit 308 stores information indicating the gross profit upon selling the item. The gross profit ratio 309 stores information indicating the gross profit ratio upon selling the item. The gross profit/t 310 stores information indicating the gross profit per ton upon selling the item.

Here, the sales increase, selling price change item extraction unit 112 refers to the sales increase, selling price change effect management table 300 when extracting the sales increase, selling price change item among a plurality of items belonging to "product 1" in which spare capacity is available by using, for example, information of the gross profit 308 as the profit amount of the product as the restricting condition of sale or production, and extracts "item 2" recorded on the twelfth line as the first rank, "item 1" recorded on the fourth line as the second rank, and "item 1" recorded on the third line as the third rank. Moreover, the sales increase, selling price change item extraction unit 112 refers to the sales increase, selling price change effect management table 300 when extracting the sales increase, selling price change item among a plurality of items belonging to "product 1" in which spare capacity is available by using, for example, information of the gross profit/t 310 as the improved profit amount of the product per production ton as the restricting condition of sale or production, and extracts "item 1" recorded on the sixth line as the first rank, "item 2" recorded on the ninth line as the second rank, and "item 2" recorded on the tenth line as the third rank.

Here, the sales increase, selling price change item extraction unit 112 functions as the item extraction unit (item extraction program) which uses an index indicating, for example, the profit amount of a specific product or the improved profit amount of a specific product per production ton as the restricting condition of sale or production among the specific products, and extracts a plurality of items which satisfy the foregoing index and configure the specific product with regard to the profit improvement strategy (sales increase strategy or discount/spot sales increase strategy).

FIG. 10 is a configuration diagram of the product, process-based spare capacity management table according to this embodiment. In FIG. 10, the product, process-based spare capacity management table 400 is the processing result of step S33 or step 43 (processing result of the product, process-based spare capacity calculation unit 113) and is a table for managing the spare capacity by product and by process, comprises the items of # (number) 401, product 402, total supply quantity 403, and operating rate (spare capacity) 404, and is stored in the product, process-based spare capacity storage DB 103. Here, the total supply quantity 403 is divided into a Japanese factory 405, a Chinese factory 406, and a French factory 407, and the operating rate (spare capacity) 404 is divided into a Japanese factory 408, a Chinese factory 409, and a French factory 410. Moreover, the Japanese factory 408 belonging to the operating rate (spare capacity) 404 is divided into the items of A process 411, B process 412, and C process 413, the Chinese factory 409 is divided into the items of A process 414, B process 415, and C process 416, and the French factory 410 is divided into the items of A process 417, B process 418, and C process 419.

The # (number) 401 stores information related to numbers. The product 402 stores information for uniquely identifying a product among multiple products. The total supply quantity 403 stores information of the supply quantity that can be supplied based on the spare capacity after the current demand (sales plan) of each product is satisfied, and additionally stores breakdown information of the supply quantity that can be supplied by the Japanese factory 405, the Chinese factory 406, and the French factory 407, respectively. The operating rate (spare capacity) 404 stores, for each process of each factory, information indicating the operating rate remaining as the spare capacity upon producing the product based on each process of the factory.

Here, in the process manufacturing of a chemical product or the like, a product is manufactured and sold midway during the manufacturing process such as the A process product of the product 1, the B process product of the product 1, and the C process product of the product 1. Accordingly, when plotting the sales increase strategy or the discount, spot sales increase strategy, it is necessary to confirm which process has spare capacity and is able to increase sales. This example is shown in FIG. 10. In FIG. 10, "product 1" has been selected as the product 402 in which spare capacity is available and determined to have the greatest improved profit amount in step S31 (FIG. 8A). When plotting the sales increase strategy, for example, by utilizing the spare capacity of 83.9 tons of "product 1" of the Chinese factory shown in FIG. 8A, it is possible to confirm that the A process 414 of the Chinese factory has spare capacity by referring to the Chinese factory 409 of the operating rate (spare capacity) 404 in the product, process-based spare capacity management table 400. Thus, by manufacturing "item 2, A process product" or the like identified in FIG. 9 based on the A process 414 of the Chinese factory, it is possible to plot a strategy in which spare capacity is available.

Figure 11A:
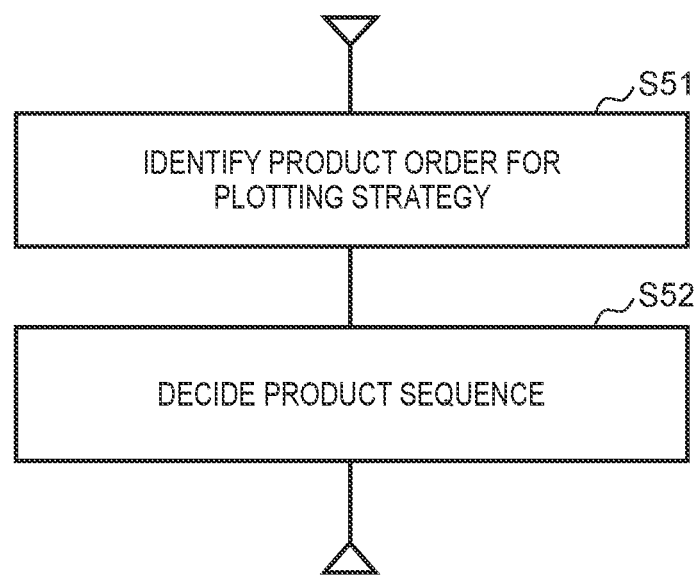
FIG. 11A is a flowchart for explaining the processing of the spare capacity availability-based improvement effect product order calculation unit according to this embodiment.

FIG. 11A is a flowchart for explaining the processing of the spare capacity availability-based improvement effect product order calculation unit according to this embodiment. This processing is the specific content of step S5, and is started as a result of the CPU 11 activating the spare capacity availability-based improvement effect product order calculation unit 111. In FIG. 11A, the spare capacity availability-based improvement effect product order calculation unit 111 applies the bottleneck facility/process improvement strategy as the third profit improvement strategy to each product in which "spare capacity is not available" was determined, and calculates the improvement effect of each product. Specifically, the spare capacity availability-based improvement effect product order calculation unit 111 identifies the product order of plotting a strategy from the lost gross profit amount or the lost gross profit per ton of the non-producible product based on the processing result of step S2 (steps S21 and S22) (S51).

Next, the spare capacity availability-based improvement effect product order calculation unit 111 decides the product sequence based on the processing result of step S51 and the information stored in the product-based excess/deficiency improvement effect storage DB 101 (for example, information of the gross profit amount (lost gross profit) of a specific product or the gross profit amount (lost gross profit) per production ton of a specific product), stores information such as the bottleneck flag of each product as the decided content in the bottleneck facility storage DB 104 by factory and by process (S52), and then ends the processing of this routine.

Here, the spare capacity availability-based improvement effect product order calculation unit 111 functions as the improvement effect calculation unit which applies the bottleneck facility/process improvement strategy to each product in which "spare capacity is not available" was determined, and calculates the improvement effect of each product to which the bottleneck facility/process improvement strategy was applied, and additionally functions as the product selection unit which selects a specific product among the respective products in which the improvement effect has exceeded a set value (for example, the product ranked first in terms of the improvement effect) with regard to the bottleneck facility/process improvement strategy based on each calculation result of the improvement effect calculation unit.

Figure 11B:
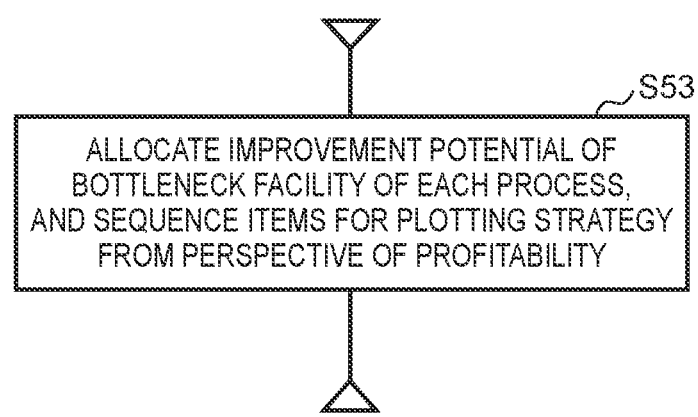
FIG. 11B is a flowchart for explaining the processing of the bottleneck facility identification unit or the bottleneck improvement item candidate extraction unit according to this embodiment.

FIG. 11B is a flowchart for explaining the processing of the bottleneck facility identification unit or the bottleneck improvement item candidate extraction unit according to this embodiment. This processing is the specific content of step S5, and is started as a result of the CPU 11 activating the bottleneck facility identification unit 114 or the bottleneck improvement item candidate extraction unit 115. In FIG. 11B, the bottleneck facility identification unit 114 or the bottleneck improvement item candidate extraction unit 115 allocates the improvement potential of the bottleneck facility, which is a bottleneck in each process, to the selected product as bottleneck improvement and sequences the items for plotting a strategy from the perspective of profitability based on the processing result of step S2 (steps S21 and S22), records the sequenced contents in a list, decides the item among the recorded contents in consideration of the customer's circumstances (S53), and then ends the processing of this routine. The improvement potential of all products may also be allocated to directly identify an item with high profitability.

Figure 12A:
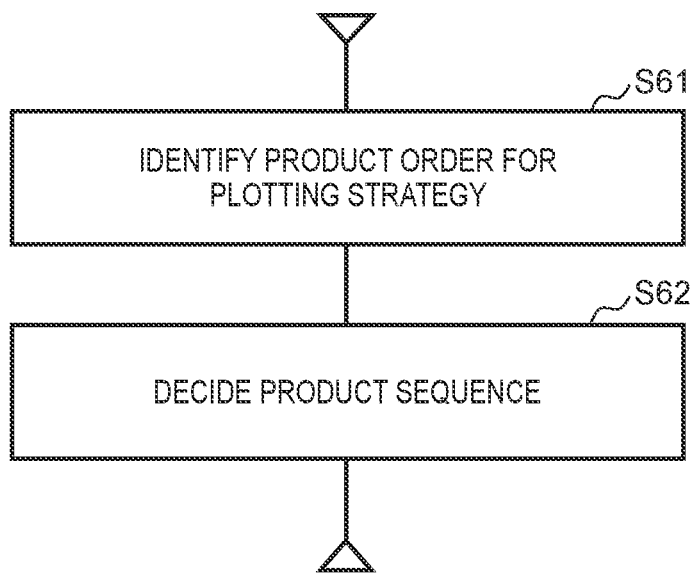
FIG. 12A is a flowchart for explaining the processing of the spare capacity availability-based improvement effect product order calculation unit according to this embodiment.

FIG. 12A is a flowchart for explaining the processing of the spare capacity availability-based improvement effect product order calculation unit according to this embodiment. This processing is the specific content of step S6, and is started as a result of the CPU 11 activating the spare capacity availability-based improvement effect product order calculation unit 111. In FIG. 12A, the spare capacity availability-based improvement effect product order calculation unit 111 applies the profit perspective/sales perspective-based swap strategy as the fourth profit improvement strategy to each product in which "spare capacity is not available" was determined, and calculates the improvement effect of each product. Specifically, the spare capacity availability-based improvement effect product order calculation unit 111 identifies the product order of plotting a strategy from the lost gross profit amount or the lost gross profit per ton of the non-producible product based on the processing result of step S2 (steps S21 and S22) (S61).

Next, the spare capacity availability-based improvement effect product order calculation unit 111 decides the product sequence based on the processing result of step S61 and the information stored in the product-based excess/deficiency improvement effect storage DB 101, stores information of the swap candidate by item and by customer as the decided content in the high/low profit product swap item storage DB 105 (S62), and then ends the processing of this routine.

Here, the spare capacity availability-based improvement effect product order calculation unit 111 functions as the improvement effect calculation unit which applies the profit perspective/sales perspective-based swap strategy to each product in which "spare capacity is not available" was determined, and calculates the improvement effect of each product to which the profit perspective/sales perspective-based swap strategy was applied, and additionally functions as the product selection unit which selects a specific product among the respective products in which the improvement effect has exceeded a set value (for example, the product ranked first in terms of the improvement effect) with regard to the profit perspective/sales perspective-based swap strategy based on each calculation result of the improvement effect calculation unit.

Figure 12B:
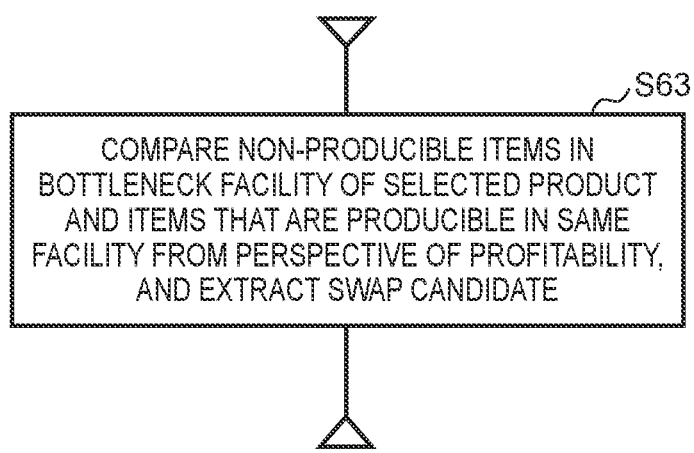
FIG. 12B is a flowchart for explaining the processing of the high/low profit product swap candidate extraction unit according to this embodiment.

FIG. 12B is a flowchart for explaining the processing of the high/low profit product swap candidate extraction unit according to this embodiment. This processing is the specific content of step S6, and is started as a result of the CPU 11 activating the high/low profit product swap candidate extraction unit 116. In FIG. 12B, the high/low profit product swap candidate extraction unit 116 extracts the non-producible item in the bottleneck facility of the selected product and items that are producible in the same facility as the high/low profit product swap based on the processing result of step S2 (steps S21 and S22), compares the extracted contents from the perspective of profitability, records the swap candidates obtained from the comparative result in a list (S63), and then ends the processing of this routine.

Note that, the expression of "perspective of profitability" in step S63 may also be swapped from the perspective of sales in addition to profits. In addition, a high profit product which is meeting the demand and without no non-producible product may also be swapped with a low profit product.

Figure 13:
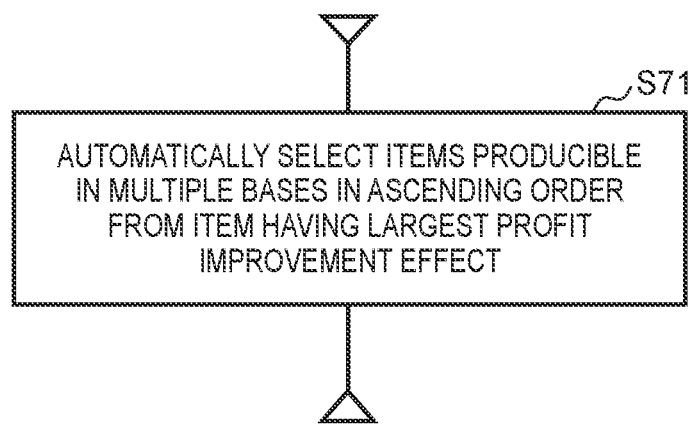
FIG. 13 is a flowchart for explaining the processing of the production site change candidate extraction unit according to this embodiment.
Figure 19A:
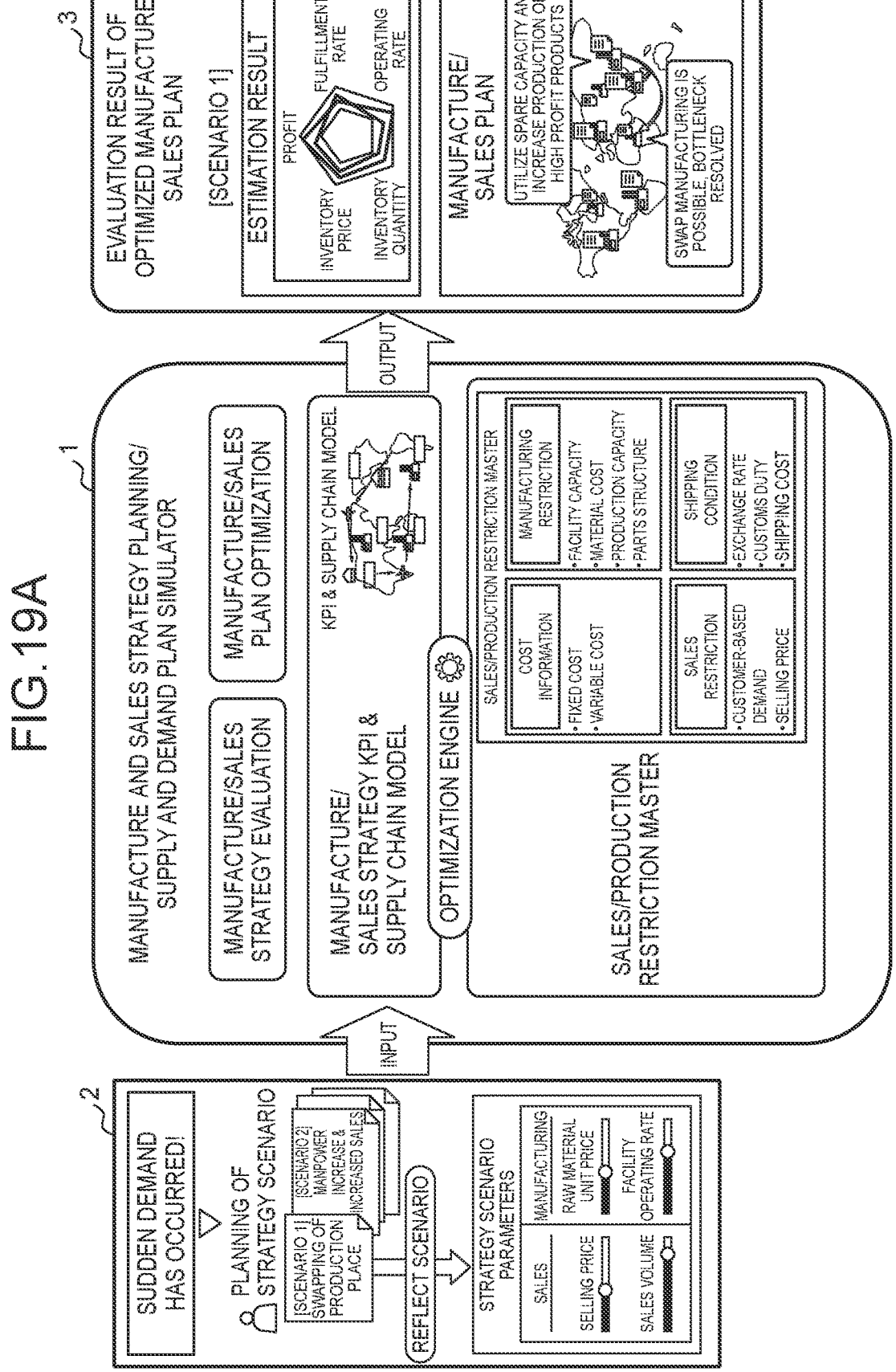
FIG. 19A is the first part of an explanatory diagram showing the overall image of the solution according to this embodiment.
Figure 19B:
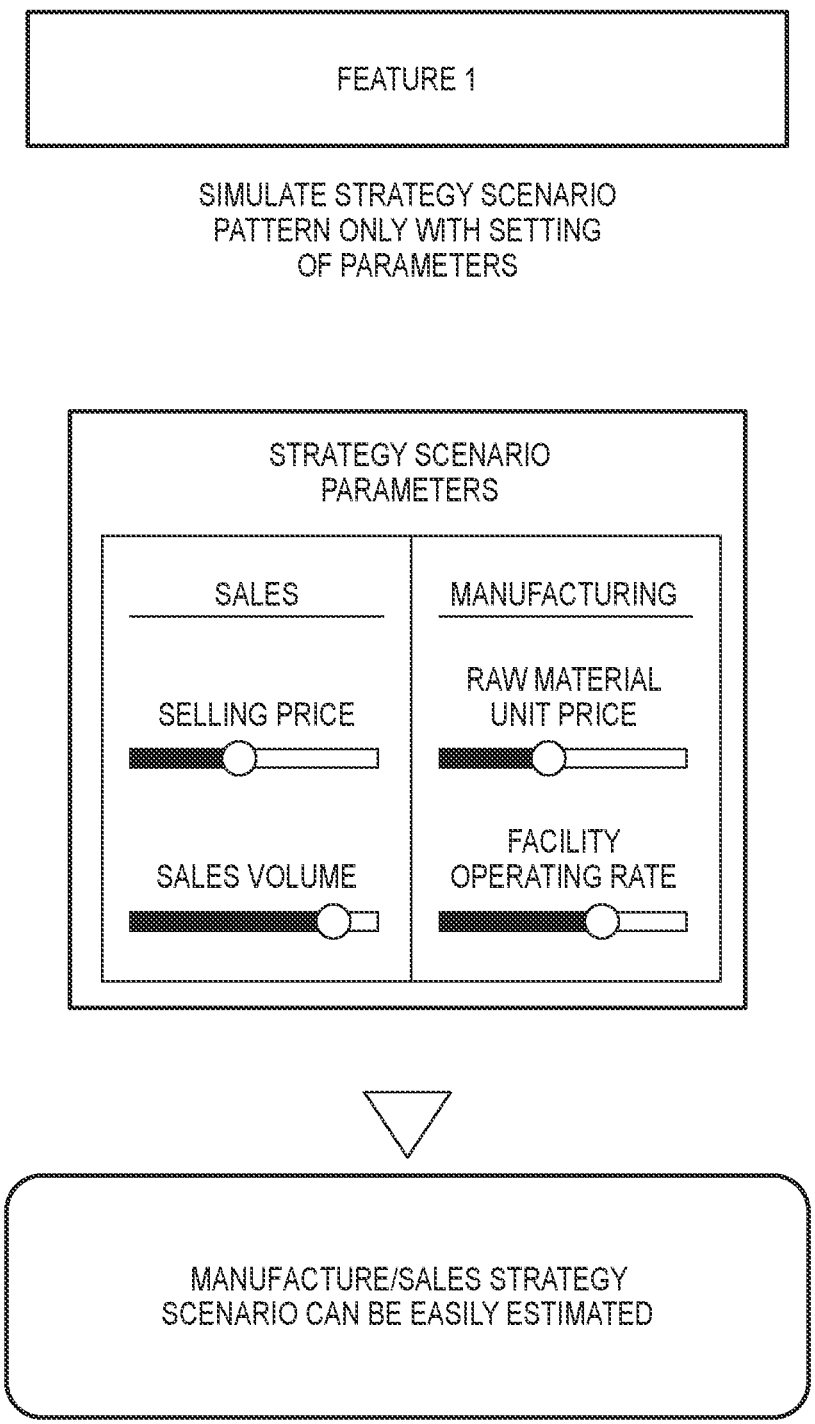
FIG. 19B is the second part of the explanatory diagram showing the overall image of the solution according to this embodiment.
Figure 19C:
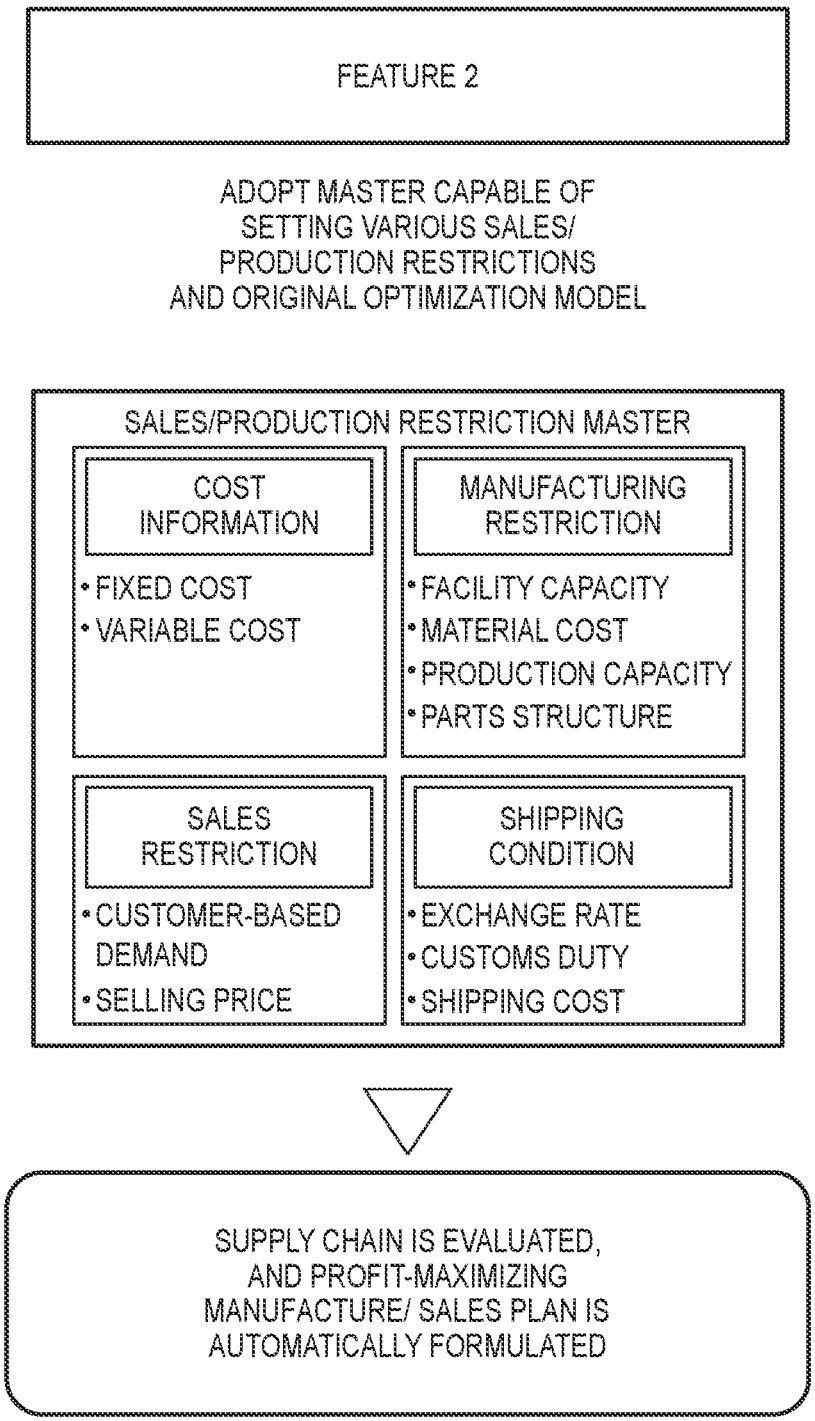
FIG. 19C is the third part of the explanatory diagram showing the overall image of the solution according to this embodiment.

FIG. 13 is a flowchart for explaining the processing of the production site change candidate extraction unit according to this embodiment. This processing is the specific content of step S7, and is started as a result of CPU 11 activating the production site change candidate extraction unit 117. In FIG. 13, the production site change candidate extraction unit 117 applies the production site change strategy as the fifth profit improvement strategy to each product in which "spare capacity is not available" was determined, and calculates the improvement effect of each product to which the production site change strategy was applied. Specifically, the production site change candidate extraction unit 117 automatically selects items producible in a plurality of sites in descending order of the profit improvement effect among all products/items or non-producible products/items as the change of production site based on the processing result of step S2 (steps S21 and S22), identifies the items that can be swapped based on the amount of improvement, customer restriction and facility restriction by process upon changing the production site based on the selected content (S71), and then ends the processing of this routine.

Here, the production site change candidate extraction unit 117 functions as the improvement effect calculation unit which applies the production site change strategy to each product in which "spare capacity is not available" was determined, and calculates the improvement effect of each product to which the production site change strategy was applied, and additionally functions as the product selection unit which selects a specific product among the respective products in which the improvement effect has exceeded a set value (for example, the product ranked first in terms of the improvement effect) with regard to the production site change strategy based on each calculation result of the improvement effect calculation unit.

FIG. 14 is a configuration diagram of the product-based excess/deficiency improvement effect management table according to this embodiment. The product-based excess/deficiency improvement effect management table 250 is the processing result of step S51 or step S61 and is a table for managing information in cases where the spare capacity is not available, comprises the items of # (number) 251, product 252, demand quantity (t) 253, supply quantity (t) 254, supply quantity breakdown 255, sales (K¥) 256, gross profit (K¥) 257, gross profit ratio 258, non-producible 259, and determination 260, and is stored in the product-based excess/deficiency improvement effect storage DB 101. Moreover, the supply quantity breakdown 255 is divided into a Japanese factory 261, a Chinese factory 262, and a French factory 263. The non-producible 259 is divided into a non-producible quantity (t) 264, lost sales (K¥) a 265, lost gross profit (K¥) 266, and a lost gross profit (K¥/t) 267. The product-based excess/deficiency improvement effect management table 250 shown in FIG. 14 stores the same information as the information stored in the product-based excess/deficiency improvement effect management table 250 shown in FIG. 5B.

Here, when referring to the product-based excess/deficiency improvement effect management table 250 shown in FIG. 14 from the perspective of "lost gross profit 266", "product 7" can be identified as the first rank among the products as the product 252 in cases where spare capacity is not available.

FIG. 15 is a configuration diagram of the bottleneck facility management table according to this embodiment. In FIG. 15, the bottleneck facility management table 500 is the processing result of step S21 and is a table for managing the facility that is a bottleneck in relation to the current demand, comprises the items of # (number) 501, manufacturing site 502, process 503, facility 504, preconditions 505, and simulation result 506, and is stored in the bottleneck facility storage DB 104. Here, the preconditions 505 are divided into an annual facility operating time 507, and a manpower coefficient 508, and the simulation result 506 is divided into a production volume (t) 509, an operating rate 510, a required operating time (h) 511, a required improvement rate 512, and a produced product 513. Moreover, the produced product 513 is divided into a plurality of product items 514 to 518.

The # (number) 501 stores information related to numbers. The manufacturing site 502 stores information of the factory indicating the manufacturing site that is manufacturing the product. The process 503 stores information for identifying the manufacturing process of the factory that is manufacturing the product. The facility 504 stores information for identifying the facility to be used in the process of the factory that is manufacturing the product. The annual facility operating time 507 of the preconditions 505 stores information indicating the operating time in which the facility to be used in the process of the factory that is manufacturing the product can be operated annually. The manpower coefficient 508 of the preconditions 505 stores information indicating the coefficient related to the production capacity of workers using the facility to be used in the process of the factory that is manufacturing the product. The production volume (t) 509 of the simulation result 506 stores information indicating the production volume in the process of the factory that is manufacturing the product. The operating rate 510 stores information indicating the operating rate of the facility used in the process of the factory that is manufacturing the product. The required operating time (h) 511 stores information indicating the operating time of the facility in the process of the factory required for producing the product in which certain products are non-producible. The required improvement rate 512 stores information indicating the improvement rate of the operating time of the facility in the process of the factory required for producing the product in which certain products are non-producible. The respective product items 514 to 518 of the produced product 513 store "○" as information indicating that there is no non-producible product, and stores "●" as information indicating that there is a non-producible product.

Here, in S53, when "facility 6" is identified as the facility 504 that is manufacturing "product 7" as a product in which spare capacity is not available and with a significant improvement effect since the lost gross profit amount (K¥) in FIG. 14 is great, upon referring to the bottleneck facility management table 500, since "manpower coefficient 508" of "facility 6" of "process B" of "Japanese factory" is "75%" and there is leeway up to 100%, the improvement potential can be increased from "75%" to "80%" in relation to "facility 6".

FIG. 16 is a configuration diagram of the bottleneck improvement item candidate extraction list according to this embodiment. In FIG. 16, the bottleneck improvement item candidate extraction list 550 is the processing result of step S53 and is a list for managing the bottleneck improvement item candidates, and is configured from the items of product 551, item 552, customer name 553, sales site 554, demand quantity 555, non-producible quantity 556, post-manning supply quantity 557, and improved profit amount (K¥) 558.

The product 551 stores information for identifying the product among multiple products. The item 552 stores information for identifying the item belonging to the product. The customer name 553 stores information indicating the name of the customer to become the sale destination of the product. The sales site 554 stores information indicating the sales site of the product. The demand quantity 555 stores information indicating the demand quantity of the product. The non-producible quantity 556 stores information indicating the non-producible quantity of the product as a simulation result. The post-manning supply quantity 557 stores information indicating the supply quantity of the product after introducing manpower. The improved profit amount (K¥) 558 stores information indicating the profit amount after improvement. Note that the information recorded in the bottleneck improvement item candidate extraction list 550 is displayed on the screen of the output device 50 by the CPU 11.

Note that, in the example shown in FIG. 16, "items 10 to 13" belonging to "product 1" are extracted as the improvement item candidate by customer. Here, "item 10" of "product 7" for the customer 1 from the improved profit amount (K¥) is identified as the sales strategy since the improvement effect is ranked first when the improvement potential of "manpower coefficient" of "facility 6" of "process B" of "Japanese factory" shown in FIG. 15 is increased from 75% to 85%. Meanwhile, the user can also designate and extract specific "customers 3 and 4" as the sales strategy in terms of the relationship with customers based on the restriction of sale. Moreover, an item having high profitability may also be directly identified by allocating, as the improvement potential, "manpower coefficient" of all products based on the manufacturing strategy of additionally introducing manpower or performing overtime work or "annual facility operating time" or the like of all products based on the manufacturing strategy of streamlining the switching of products of the facility and thereby reducing the man hours of facility changeovers.

Here, the bottleneck improvement item candidate extraction unit 115 functions as the item extraction unit which uses an index indicating, for example, the profitability of a specific product as the restricting condition of sale or production among the specific products, and extracts an item having improvement potential with a significant bottleneck improvement effect among the plurality of items which satisfies the foregoing index and configures the specific product.

FIG. 17A is a configuration diagram of the high/low profit product swap item management table according to this embodiment. In FIG. 17A, the bottleneck facility management table 600 is the processing result of step 21 (S21) and is a table for searching for candidates of the high/low profit product swap, comprises the items of # (number) 601, manufacturing site 602, process 603, facility 604, and produced product 605, and is stored in the bottleneck facility storage DB 104. Here, the produced product 605 is divided into a plurality of product items 606 to 610.

The # (number) 601, the manufacturing site 602, the process 603, the facility 604, and the produced product 605 respectively store the same information as the # (number) 501, the manufacturing site 502, the process 503, the facility 504, and the produced product 513 of the simulation result 506 of the bottleneck facility management table 500 shown in FIG. 15. Here, from the information recorded in the bottleneck facility management table 600, as the facility that is producing the candidate of the high/low profit product swap, for example, identified is "facility 6" as the facility 504 that is manufacturing "product 7" as a product in which spare capacity is not available and having a significant improvement effect since the lost gross profit amount (K¥) is great in FIG. 14.

FIG. 17B is a configuration diagram of the swap candidate extraction list 620 according to this embodiment, and is stored in the high/low profit product swap item storage DB as the high/low profit product swap item management table. The high/low profit product swap item management table is the processing result of step S63. In FIG. 17B, the swap candidate extraction list 620 is a list for managing the items extracted as low profit swap candidates, and comprises the items of sales site 621, customer name 622, manufacturing site 623, product 624, item 625, quantity 626, and profit/t 627. The sales site 621 stores information indicating the sales site of the item. The customer name 622 stores information indicating the name of the customer to become the sales destination of the item. The manufacturing site 623 stores information related to the name of the factory indicating the manufacturing site of the item. The product 624 stores information of the product configuring the item. The item 625 stores information related to the name of the item extracted as a low profit swap candidate. The quantity 626 stores information indicating the quantity of items extracted as low profit swap candidates. The profit/t 627 stores information indicating the profit per ton upon selling the item. Note that the information recorded in the swap candidate extraction list 620 is displayed on the screen of the output device 50 by the CPU 11. Here, as a result of the processing of step S63, as the items to become the high/low profit product swap candidates, for example, extracted as the swap candidate extraction list 620 are "item 1", "item 2", and "item 3" of "product 5" being manufactured in the same facility as "product 7" from the information of FIG. 17A and the facility capacity master which have a lower improvement effect in terms of "lost gross profit (K¥/t)" in comparison to "product 7" determined to have the greatest improvement effect of "lost gross profit (K¥)" in FIG. 14. Since these items are low profit items from the perspective of profit amount/t among the items that are currently being produced, they will be an effective manufacturing strategy in creating spare capacity by being swapped with high profit products and increasing profits based on spot sales.

FIG. 17C is a configuration diagram of the high profit non-producible product extraction list 630 of "product 7" having the greatest improvement effect of "lost gross profit (K¥)" in FIG. 14 according to this embodiment, and is stored as the high/low profit product swap item management table in the high/low profit product swap item storage DB. The high/low profit product swap item management table is the processing result of step S63. In FIG. 17C, the non-producible product extraction list 630 is a list for managing the items extracted as high profit non-producible products, and comprises the items of item 631, customer name 632, sales site 633, demand quantity 634, profit amount/t 635, product 636, and non-producible quantity 637.

The item 631 stores information related to the name of the item extracted as a high profit non-producible product. The customer name 632 stores information indicating the name of the customer to become the sales destination of the item. The sales site 633 stores information indicating the sales site of the item. The demand quantity 634 stores information indicating the demand quantity of the item. The profit amount/t 635 stores information indicating the profit per ton upon selling the item. The product 636 stores information indicating the product of the item. The non-producible quantity 637 stores information indicating the quantity of items that became non-producible. Here, as a result of the processing of step S63, as the items to become the high profit non-producible product of "product 7" determined to have the greatest improvement effect of "lost gross profit (K¥)" in FIG. 14, for example, "item 10", "item 11", "item 12" are extracted as the non-producible product extraction list 630, which is a list of high profit swap target items. Note that the information recorded in the non-producible product extraction list 630 is displayed on the screen of the output device 50 by the CPU 11.

Here, as a result of the processing of step S63, the items extracted from the swap candidate extraction list 620 and the high profit non-producible product extraction list 630 are compared from the perspective of "profit amount/t", and, among the items of the swap candidate extraction list 620, the items in which the pre-set "profit amount/t" is less than 2100000 Kt are swapped with the items in which the pre-set "profit amount/t" is equal to or greater than the high profit non-producible product extraction list 630 based on the foregoing reference value. In this example, the 1.61 t of the $2^{nd}$ to 5th line of the swap candidate extraction list 620 is swapped with the 1.2 t of the 1st to $5^{th}$ line of the high profit non-producible product extraction list 630. Note that the processing result of this step S63 is displayed on the screen of the output device 50 by the CPU 11. Note that the swap reference value such as the profit amount/t may be pre-set, or designated by the user upon viewing the results of the swap candidate extraction list 620 or the high profit non-producible product extraction list 630.

Here, the high/low profit product swap candidate extraction unit 116 functions as the item extraction unit which uses an index indicating, for example, the profitability of a specific product as the restricting condition of sale or production among the specific products, and extracts a producible low profit product or a high profit product belonging to a non-producible product as the item to become the high/low profit product swap candidate (target) among the among the plurality of items which satisfies the foregoing index and configures the specific product.

FIGS. 18A and 18B are a configuration diagram of the production site change item management table according to this embodiment. In FIGS. 18A and 18B, the production site change item management table 700 is the processing result of step S71 of FIG. 13 and is a table for managing the production site change candidates, comprises the items of # (number) 701, product 702, item 703, sales site 704, manufacturing site 705, quantity (t) 706, change pattern 707, deviation at time of production site change (target item) 708, and deviation at time of production site change (overall) 709, and is stored in the production site change item storage DB 106. Here, the manufacturing site 705 is divided into before change 710, and after change 711, the deviation at time of production site change (target item) 708 is divided into a manufacturing cost (K¥/t) 712, a material cost 713, a shipping cost 714, and a customs duty 715, and the deviation at time of production site change (overall) 709 is divided into sales (K¥) 716, a gross profit (K¥) 717, and a supply quantity (t) 718.

The # (number) 701 stores information of the number for identifying the production site change item. The product 702 stores information indicating the product of the production site change item. The item 703 stores information of the item for identifying the production site change item. The sales site 704 stores information indicating the sales site of the production site change item. The before change 710 of the manufacturing site 705 stores information of the factory indicating the manufacturing site of the production site change item before change. The after change 711 of the manufacturing site 705 stores information of the factory indicating the manufacturing site of the production site change item after change. The quantity (t) 706 stores information indicating the item production quantity that can be achieved by performing the production site change. The change pattern 707 stores information related to the change pattern of the production site change item, for example, stores the information of "manufacturing cost reduction/inventory utilization". The manufacturing cost (K¥/t) 712 of the deviation at time of production site change (target item) 708 stores information indicating the deviation, before and after the change, of the manufacturing cost at the manufacturing site at the time of the production site change. The material cost 713 stores information indicating the deviation, before and after the change, of the material cost in the manufacturing cost at the manufacturing site at the time of the production site change. The shipping cost 714 stores information indicating the deviation, before and after the change, of the shipping cost in the manufacturing cost at the manufacturing site at the time of the production site change. The customs duty 715 stores information indicating the deviation, before and after the change, of the customs duty in the manufacturing cost at the manufacturing site at the time of the production site change. The sales 716 of the deviation at time of production site change (overall) 709 stores information indicating the overall sales deviation, before and after the change, at the time of the production site change. The gross profit 717 stores information indicating the overall gross profit deviation, before and after the change, at the time of the production site change. The supply quantity (t) 718 stores information indicating the overall supply quantity deviation, before and after the change, at the time of the production site change.

Here, the production site change candidate extraction unit 117 functions as the item extraction unit which refers to the information stored in the BOM 108, uses an index for indicating, for example, the profit improvement effect of a specific product or an item configuring a specific product as a restricting condition of sale or production among the specific products, and extracts the item having the greatest profit improvement effect as the item that can be subject to the production site change among the plurality of items which satisfy the foregoing index and configure the specific product, for example, extracts the item 6 configuring the product 7. Note that the production site change candidate extraction unit 117 may also refer to the information stored in the BOM 108, select a product that may be subject to the production site among all products or non-producible products, and extract the item having the greatest profit improvement effect among the items configuring the selected product. Moreover, the production site change candidate extraction unit 117 may also automatically extract products/items that can be swapped by process or by facility in the factory in addition to the production site.

According to this embodiment, it is possible to plan a manufacture and sales strategy which improves the profit according to the availability of the spare production capacity for each item configuring a specific product among a plurality of products. Moreover, according to this embodiment, by visualizing the improvement effect based on each profit improvement strategy or the content of the manufacture and sales strategy of each item, the improvement effect based on each profit improvement strategy or the content of the manufacture and sales strategy of each item can be presented to the user, and it is possible to promote the consensus building of the user based on objective evidence.

Note that the present invention is not limited to each of the embodiments described above, and includes various modified examples. For example, the storage medium reader 30, the input device 40 and the output device 50 may be integrated as components of the manufacture and sales strategy planning device 10, and built into the manufacture and sales strategy planning device 10. The foregoing embodiments were explained in detail for explaining the present invention in an easy-to-understand manner, and the present invention does not need to necessarily comprise all of the configurations explained in the embodiments. Moreover, a part of the configuration of a certain embodiment may be replaced with the configuration of another embodiment, and the configuration of another embodiment may be added to the configuration of one embodiment. Moreover, another configuration may be added to, deleted from or replaced with a part of the configuration of each embodiment.

Moreover, a part or all of the respective configurations, functions and the like described above may be realized with hardware such as an integrated circuit. Moreover, the respective configurations, functions and the like described above may also be realized with software as a result of the processor interpreting and executing programs which realize the respective functions. Moreover, information of programs, tables and files which realize the respective functions may be recorded in a memory, a hard disk, an SSD (Solid State Drive) or any other recording device, or may otherwise be recorded on an IC (Integrated Circuit) card, an SD (Secure Digital) memory card, a DVD (Digital Versatile Disc) or any other storage medium.

What is claimed is:

1. A manufacture and sales strategy planning method, comprising:

a spare production capacity determination step of determining, based on information related to a sales plan of a plurality of products and a production capacity of a production facility to produce each of the plurality of products, whether there is any spare capacity in the production capacity of the production facility in relation to the sales plan for each of the products;

an improvement effect calculation step of applying one among a plurality of profit improvement strategies, according to an availability of the spare capacity, to each of the products in which the availability of the spare capacity has been determined in the spare production capacity determination step, and calculating an improvement effect of each of the products to which each of the profit improvement strategies has been applied;

a product selection step of selecting, based on each calculation result obtained in the improvement effect calculation step, a specific product among the plurality of products in which the improvement effect has exceeded a set value with regard to each of the plurality of profit improvement strategies;

an item extraction step of extracting, for each of the profit improvement strategies, an item which satisfies a restricting condition of sale or production of the specific product set in the product selection step and which configures the specific product;

a manufacture and sales strategy selection step of planning a manufacture and sales strategy related to the items extracted in the item extraction step, and selecting one or more specific item strategies based on the improvement effect, wherein a supply and demand plan is simulated by reflecting the improvement effect of the selected strategy; and a visualization step of displaying, by an output device, calculation results of the improvement effect calculation unit via a graphical user interface, the graphical user interface comprising one or more visual elements corresponding to the improvement effect.

2. The manufacture and sales strategy planning method according to claim 1, wherein:

in the improvement effect calculation step, as the one profit improvement strategy, a first profit improvement strategy including increased production and sales expansion or a second profit improvement strategy including discount-based spot sales increase and the sales expansion is applied to each of the products in which the spare capacity was determined as available in the spare production capacity determination step;

in the product selection step, the specific product is selected in descending order of a profit improvement effect for the first profit improvement strategy or the second profit improvement strategy; and in the item extraction step, the item is extracted in descending order of a profit improvement effect in correspondence with the first profit improvement strategy or the second profit improvement strategy.

3. The manufacture and sales strategy planning method according to claim 1, wherein:

in the improvement effect calculation step, as the one profit improvement strategy, a third profit improvement strategy including bottleneck facility/process improvement, a fourth profit improvement strategy including profit perspective/sales perspective-based swap, or a fifth profit improvement strategy including production site change is applied to each of the products in which the spare capacity was determined as not available in the spare production capacity determination step;

in the product selection step, the specific product is selected in descending order of a profit improvement effect for the third profit improvement strategy, the fourth profit improvement strategy or the fifth profit improvement strategy; and in the item extraction step, the item is extracted in descending order of a profit improvement effect in correspondence with the third profit improvement strategy, the fourth profit improvement strategy or the fifth profit improvement strategy.

4. The manufacture and sales strategy planning method according to claim 2, wherein:

in the spare production capacity determination step, whether there is any spare capacity in the production capacity of the production facility in relation to the sales plan is determined for each of the products, and additionally a facility that is a bottleneck is identified for each of the products as one index to which the restricting condition of sale or production belongs.

5. The manufacture and sales strategy planning method according to claim 2, wherein:

in the product selection step, parameters having a significant influence on profit improvement are allocated by combining a plurality of allocation patterns, and a product in which the improvement effect is great is identified by using information of a profit amount of the specific product or an improved profit amount per production ton of the specific product.

6. The manufacture and sales strategy planning method according to claim 3, wherein:

in the item extraction step, information indicating profitability of the specific product is used as an index to which the restricting condition of sale or production belongs, an item having improvement potential with a high bottleneck improvement effect is extracted among the items configuring the specific product selected in relation to the third profit improvement strategy, and an item in which the improvement effect is great is identified by allocating a parameter of the improvement potential.

7. The manufacture and sales strategy planning method according to claim 3, wherein:

in the item extraction step, information indicating profitability of the specific product is used as an index to which the restricting condition of sale or production belongs, a producible low profit product or a high profit product belonging to a non-producible product is extracted as an item to be subject to a high/low profit product swap among the items configuring the specific product selected in relation to the fourth profit improvement strategy, and a swap is executed based on a reference value.

8. The manufacture and sales strategy planning method according to claim 3, wherein:

in the item extraction step, information indicating a profit improvement effect of the specific product or an item configuring the specific product is used as an index to which the restricting condition of sale or production belongs, and an item in which the profit improvement effect is great is identified as a target item of the production site change among the items configuring the specific product selected in relation to the fifth profit improvement strategy.

9. The manufacture and sales strategy planning method according to claim 1, wherein the one or more visual elements is associated with at least one of a profit, an inventory price, an inventory quantity, a fulfillment rate, or an operating rate.

10. A manufacture and sales strategy planning device, comprising:

a spare production capacity determination unit which determines, based on information related to a sales plan of a plurality of products and a production capacity of a production facility to produce each of the plurality of products, whether there is any spare capacity in the production capacity of the production facility in relation to the sales plan for each of the products;

an improvement effect calculation unit which applies one among a plurality of profit improvement strategies, according to an availability of the spare capacity, to each of the products in which the availability of the spare capacity has been determined by the spare production capacity determination unit, and calculates an improvement effect of each of the products to which each of the profit improvement strategies has been applied;

a product selection unit which selects, based on each calculation result of the improvement effect calculation unit, a specific product among the plurality of products in which the improvement effect has exceeded a set value with regard to each of the plurality of profit improvement strategies;

an item extraction unit which extracts, for each of the profit improvement strategies, an item which satisfies a restricting condition of sale or production of the specific product set in the product selection unit and which configures the specific product;

a manufacture and sales strategy selection unit which plans a manufacture and sales strategy related to the items extracted by the item extraction unit, and selects one or more specific item strategies based on the improvement effect, wherein a supply and demand plan is simulated by reflecting the improvement effect of the selected strategy; and an output device which displays calculation results of the improvement effect calculation unit via a graphical user interface, the graphical user interface comprising one or more visual elements corresponding to the improvement effect.

11. The manufacture and sales strategy planning device according to claim 10, wherein:

the improvement effect calculation unit applies, as the one profit improvement strategy, a first profit improvement strategy including increased production and sales expansion or a second profit improvement strategy including discount-based spot sales increase and the sales expansion to each of the products in which the spare capacity was determined as available by the spare production capacity determination unit;

the product selection unit selects the specific product in descending order of a profit improvement effect for the first profit improvement strategy or the second profit improvement strategy; and the item extraction unit extracts the item in descending order of a profit improvement effect in correspondence with the first profit improvement strategy or the second profit improvement strategy.

12. The manufacture and sales strategy planning device according to claim 10, wherein:

the improvement effect calculation unit applies, as the one profit improvement strategy, a third profit improvement strategy including bottleneck facility/process improvement, a fourth profit improvement strategy including profit perspective/sales perspective-based swap, or a fifth profit improvement strategy including production site change to each of the products in which the spare capacity was determined as not available by the spare production capacity determination unit;

the product selection unit selects the specific product in descending order of a profit improvement effect for the third profit improvement strategy, the fourth profit improvement strategy or the fifth profit improvement strategy; and the item extraction unit extracts the item in descending order of a profit improvement effect in correspondence with the third profit improvement strategy, the fourth profit improvement strategy or the fifth profit improvement strategy.

13. The manufacture and sales strategy planning device according to claim 11, wherein:

the spare production capacity determination unit determines whether there is any spare capacity in the production capacity of the production facility in relation to the sales plan for each of the products, and additionally identifies a facility that is a bottleneck for each of the products as one index to which the restricting condition of sale or production belongs.

14. The manufacture and sales strategy planning device according to claim 11, wherein:

the product selection unit allocates parameters having a significant influence on profit improvement by combining a plurality of allocation patterns, and identifies a product in which the improvement effect is great by using information of a profit amount of the specific product or an improved profit amount per production ton of the specific product.

15. The manufacture and sales strategy planning device according to claim 12, wherein:

the item extraction unit uses information indicating profitability of the specific product as an index to which the restricting condition of sale or production belongs, extracts an item having improvement potential with a high bottleneck improvement effect among the items configuring the specific product selected in relation to the third profit improvement strategy, and identifies an item in which the improvement effect is great by allocating a parameter of the improvement potential.

16. The manufacture and sales strategy planning device according to claim 12, wherein:

the item extraction unit uses information indicating profitability of the specific product as an index to which the restricting condition of sale or production belongs, extracts a producible low profit product or a high profit product belonging to a non-producible product as an item to be subject to a high/low profit product swap among the items configuring the specific product selected in relation to the fourth profit improvement strategy, and executes a swap based on a reference value.

17. The manufacture and sales strategy planning device according to claim 12, wherein:

the item extraction unit uses information indicating a profit improvement effect of the specific product or an item configuring the specific product as an index to which the restricting condition of sale or production belongs, and identifies an item in which the profit improvement effect is great as a target item of the production site change among the items configuring the specific product selected in relation to the fifth profit improvement strategy.

18. The manufacture and sales strategy planning device according to claim 10, wherein the one or more visual elements is associated with at least one of a profit, an inventory price, an inventory quantity, a fulfillment rate, or an operating rate.

* * * * *